(12) United States Patent
Pawar et al.

(10) Patent No.: US 12,549,070 B2
(45) Date of Patent: Feb. 10, 2026

(54) SYSTEMS AND METHOD FOR AN ELECTRIC MOTOR WITH PIN-FIN COOLING

(71) Applicant: Dana Belgium N.V., Flanders (BE)

(72) Inventors: Jaywant S. Pawar, Pune (IN); Chetan Prashant, Pune (IN); Amol G. Thakare, Pune (IN); Steven Vanhee, Hooglede (BE)

(73) Assignee: DANA BELGIUM, Bruges (BE)

( * ) Notice: Subject to any disclaimer, the term of this patent is extended or adjusted under 35 U.S.C. 154(b) by 0 days.

(21) Appl. No.: 18/354,951

(22) Filed: Jul. 19, 2023

(65) Prior Publication Data
US 2023/0361654 A1 Nov. 9, 2023

Related U.S. Application Data

(62) Division of application No. 17/084,519, filed on Oct. 29, 2020, now Pat. No. 11,757,334.

(51) Int. Cl.
| | |
|---|---|
| *H02K 9/19* | (2006.01) |
| *B60K 1/00* | (2006.01) |
| *B60L 58/26* | (2019.01) |
| *H02K 5/22* | (2006.01) |
| *H02K 1/12* | (2006.01) |

(52) U.S. Cl.
CPC ............... *H02K 9/19* (2013.01); *B60K 1/00* (2013.01); *B60L 58/26* (2019.02); *H02K 5/22* (2013.01); *H02K 1/12* (2013.01)

(58) Field of Classification Search
CPC .......... H02K 9/19; H02K 9/193; H02K 5/203; H02K 5/22; H02K 1/12; B60L 58/26; B60K 1/00

USPC .......................................................... 310/53
See application file for complete search history.

(56) References Cited

U.S. PATENT DOCUMENTS

| | | | |
|---|---|---|---|
| 5,491,371 A | 2/1996 | Ooi | |
| 9,345,150 B2 | 5/2016 | Fukumasu et al. | |
| 10,621,541 B2 * | 4/2020 | Andres | ................. G06Q 10/08 |
| 2002/0084703 A1 | 7/2002 | Bunker et al. | |

(Continued)

FOREIGN PATENT DOCUMENTS

| | | | |
|---|---|---|---|
| CN | 1976176 A | 6/2007 | |
| WO | WO-2020137911 A1 * | 7/2020 | ............... B25F 5/00 |

OTHER PUBLICATIONS

WO-2020137911-A1 Machine Translation (Year: 2020).*

*Primary Examiner* — Oluseye Iwarere
*Assistant Examiner* — Masoud Vaziri
(74) *Attorney, Agent, or Firm* — McCoy Russell LLP

(57) ABSTRACT

Various methods and systems are provided for thermal management of an electric motor via a coolant flow around portions of the electric motor, where the coolant flow is disrupted by an arrangement of pin-fins. In one example, an electric motor comprises: a casing including a coolant inlet arranged opposite to a coolant outlet across a central axis of the electric motor; a stator housed within the casing and forming a plurality of pin-fins extending straight outward radially, relative to the central axis, from outer circumferential surfaces of the stator in a staggered arrangement around an entire perimeter of the stator; and a plurality of clearances formed between adjacent pin-fins of the plurality of pin-fins, the plurality of clearances adapted to flow a coolant from the coolant inlet to the coolant outlet.

13 Claims, 9 Drawing Sheets

(56) References Cited

U.S. PATENT DOCUMENTS

| | | | |
|---|---|---|---|
| 2005/0006963 A1* | 1/2005 | Takenaka | H02K 5/203 |
| | | | 310/52 |
| 2008/0100159 A1* | 5/2008 | Dawsey | H02K 1/20 |
| | | | 310/59 |
| 2012/0262012 A1 | 10/2012 | Kubes | |
| 2013/0076168 A1 | 3/2013 | Memminger et al. | |
| 2014/0354089 A1 | 12/2014 | Chamberlin et al. | |
| 2016/0118857 A1* | 4/2016 | Jeong | H02K 1/185 |
| | | | 310/54 |
| 2016/0226327 A1 | 8/2016 | Rippel et al. | |
| 2018/0375395 A1 | 12/2018 | Yamagishi | |
| 2019/0280536 A1* | 9/2019 | Niijima | H02K 1/20 |
| 2019/0291570 A1* | 9/2019 | Tang | B60K 11/04 |
| 2020/0106341 A1 | 4/2020 | Endo et al. | |
| 2020/0112226 A1* | 4/2020 | Kozarekar | H02K 1/16 |
| 2020/0295626 A1* | 9/2020 | Yuan | H02K 1/2766 |

* cited by examiner

SYSTEMS AND METHOD FOR AN ELECTRIC MOTOR WITH PIN-FIN COOLING

CROSS REFERENCE TO RELATED APPLICATION

The present application is a divisional of U.S. Non-Provisional patent application Ser. No. 17/084,519, entitled "SYSTEMS AND METHOD FOR AN ELECTRIC MOTOR WITH PIN-FIN COOLING", and filed on Oct. 29, 2020. The entire contents of the above-listed application are hereby incorporated by reference for all purposes.

TECHNICAL FIELD

The present description relates generally to systems and methods for an electric motor, and more specifically, to thermal management of an electric motor.

BACKGROUND AND SUMMARY

For automotive applications, achieving a high level of performance and reliability of an electric motor may depend on thermal management, whereby heat generated during operation of the electric motor is transferred away from the electric motor. Some electric motors are configured to be cooled via a coolant, such as oil. The coolant may flow to one or more components of the electric motor and may remove heat from the electric motor.

However, the inventors herein have recognized potential issues with such systems. As one example, components of the electric motor that come into direct contact with the coolant may slow a flow rate of coolant through the electric motor. Components configured to be cooled by the coolant may be arranged directly in the flow path of the coolant, which may obstruct the flow of the coolant and reduce an amount of cooling of the electric motor by the coolant. Further, the reduced flow rate of the coolant through the electric motor may increase a backpressure of a pump configured to flow the coolant to the electric motor and may increase a likelihood of degradation of the pump.

In one example, the issues described above may be addressed by an electric motor, comprising: a casing including a coolant inlet arranged opposite to a coolant outlet across a central axis of the electric motor; a stator housed within the casing and forming a plurality of pin-fins extending straight outward radially, relative to the central axis, from outer circumferential surfaces of the stator in a staggered arrangement around an entire perimeter of the stator; and a plurality of clearances formed between adjacent pin-fins of the plurality of pin-fins, the plurality of clearances adapted to flow a coolant from the coolant inlet to the coolant outlet. In this way, the coolant may flow between the casing and stator across surfaces of the pin-fins in order to cool the electric motor. The staggered arrangement of the pin-fins may direct the flow of the coolant across surfaces of the pin-fins and through the clearances, which may reduce a thermal resistance of the coolant, increase a flow rate of the coolant through the electric motor, reduce formation of thermal boundary layers, and increase a cooling of the electric motor by transferring heat from the stator to the coolant via the pin-fins.

As one example, the staggered arrangement of the pin-fins may be an overlapping quincunx arrangement, where the coolant may flow through the clearances and against the surfaces of the pin-fins in directions including both a circumferential direction component and an axial direction component.

It should be understood that the brief description above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE FIGURES

The present disclosure will be better understood from reading the following description of non-limiting embodiments, with reference to the attached drawings, wherein below.

DETAILED DESCRIPTION

Figure 4:
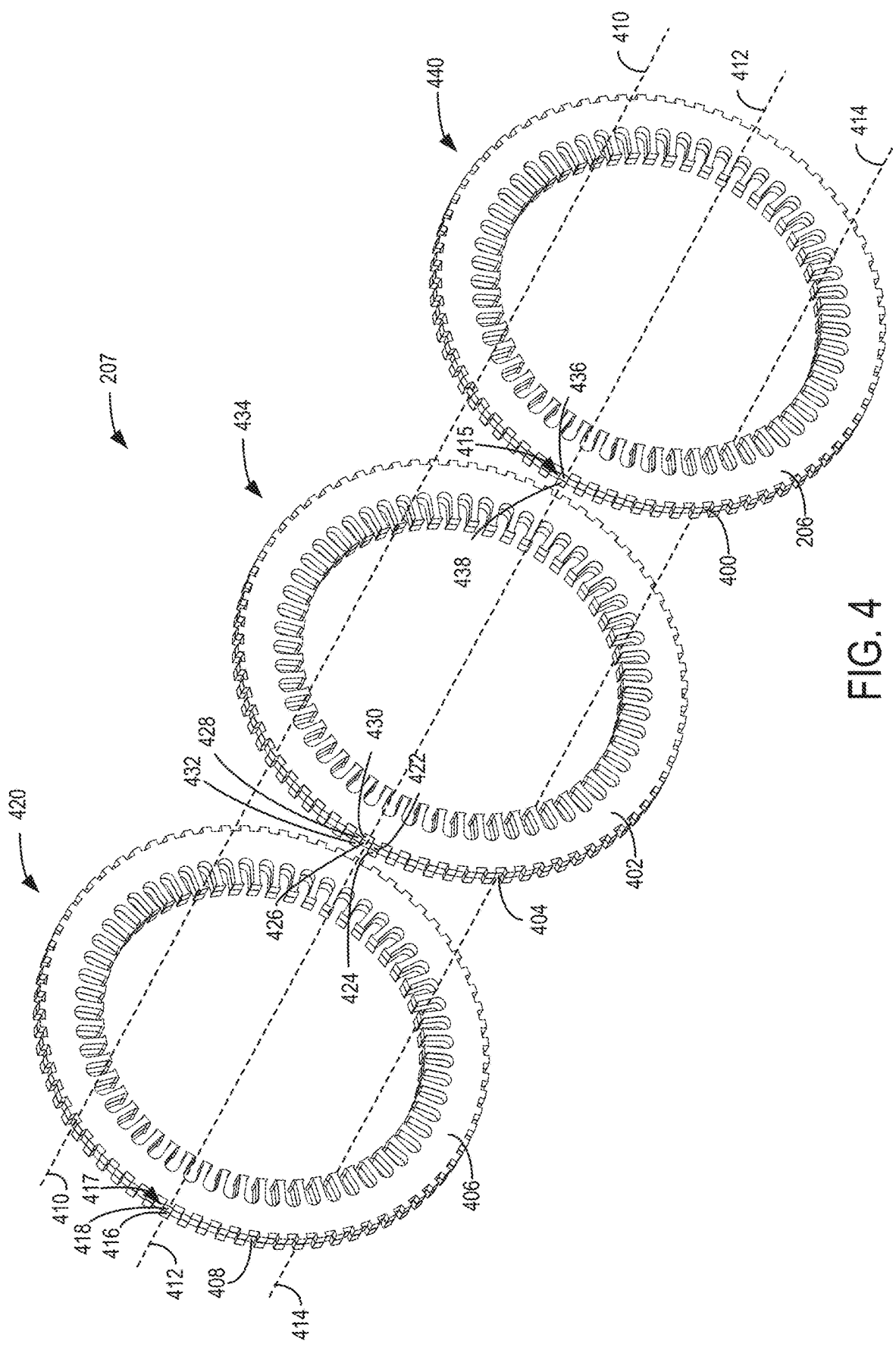
FIG. 4 shows a coaxial arrangement of three pairs of annular plates of the stator of FIG. 2.
Figure 5:
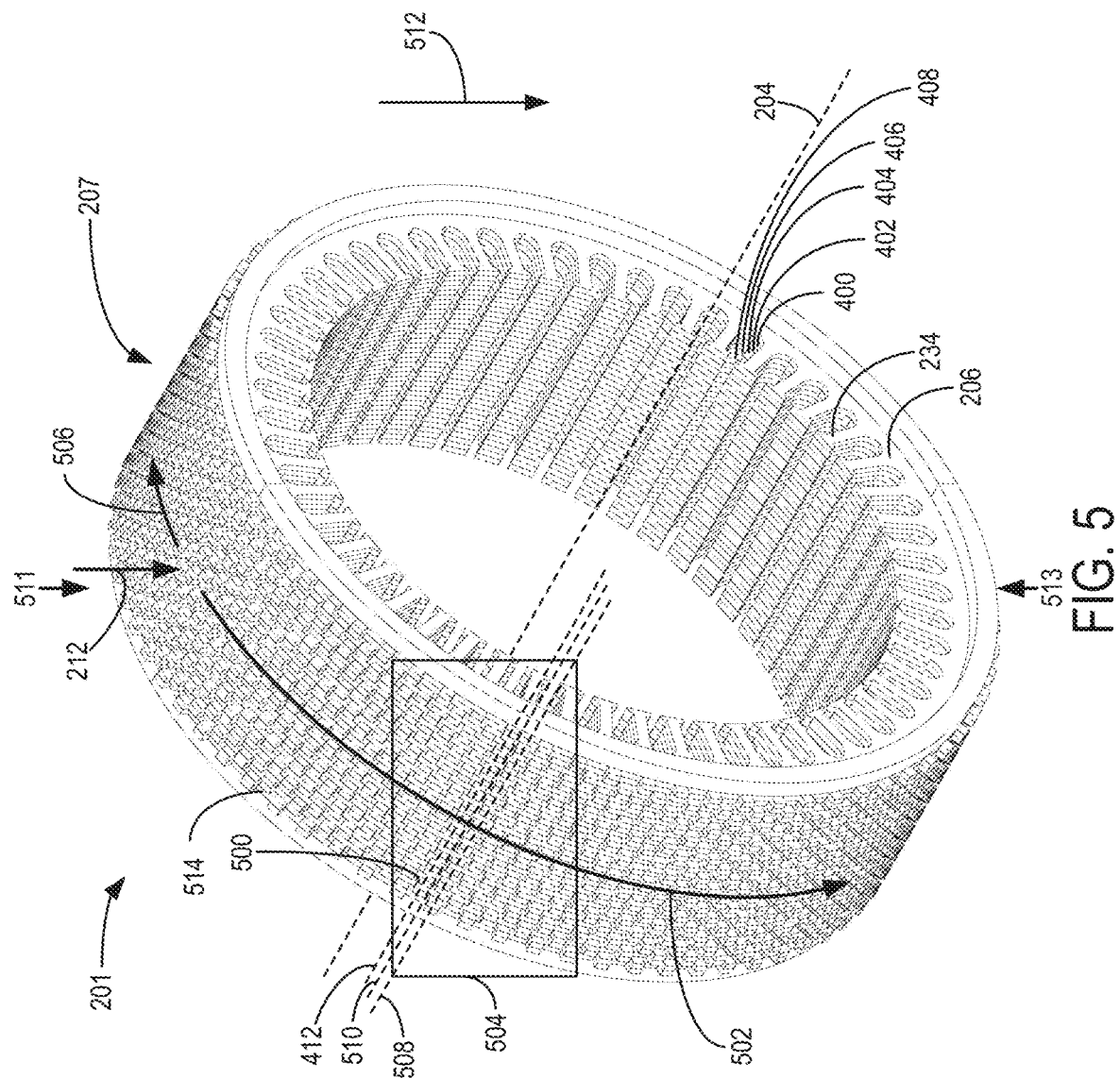
FIG. 5 shows an arrangement of pin-fins formed on an outer perimeter of the stator of FIG. 2.
Figure 6:
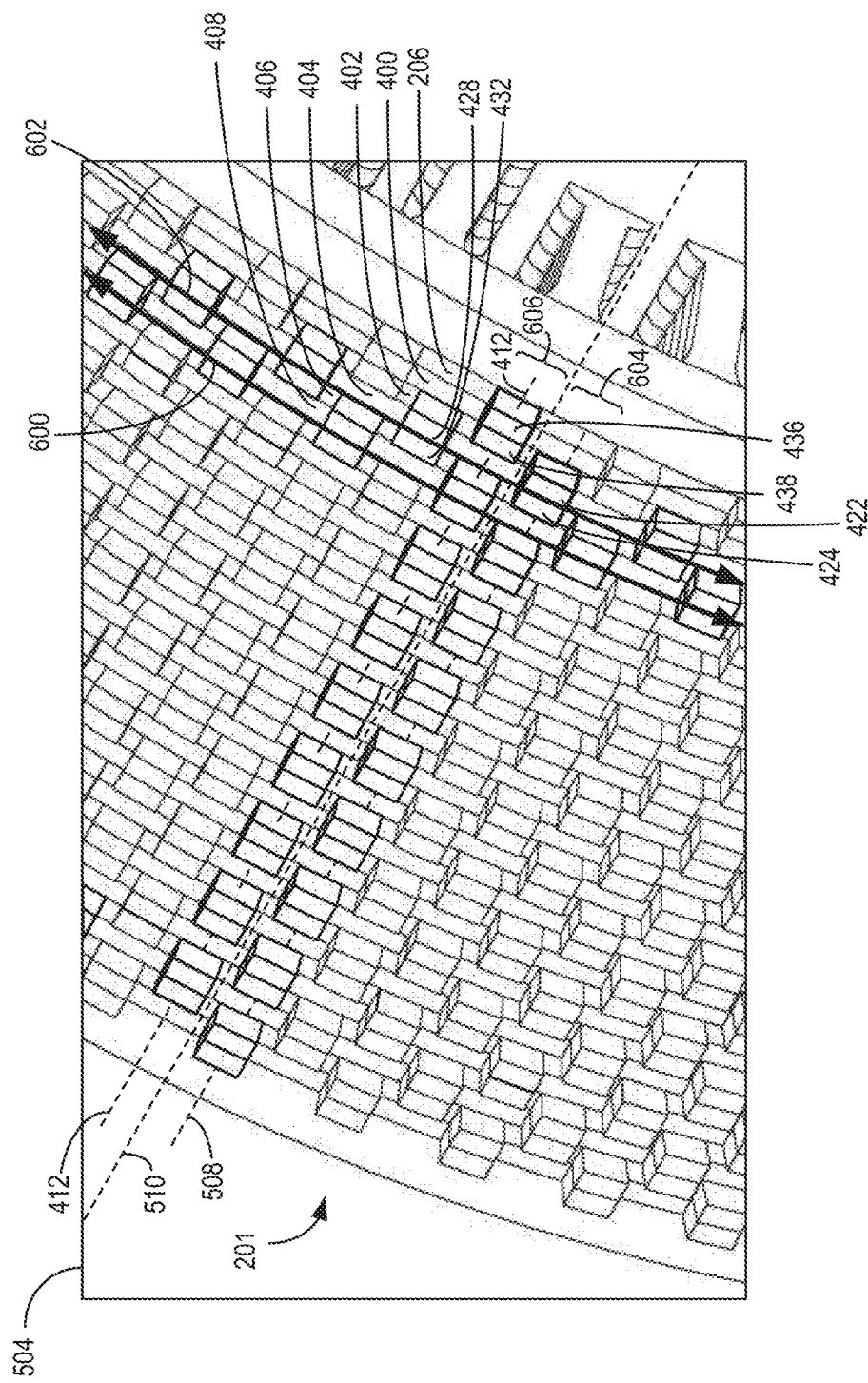
FIG. 6 shows an enlarged view of the pin-fins of FIG. 5.
Figure 7:
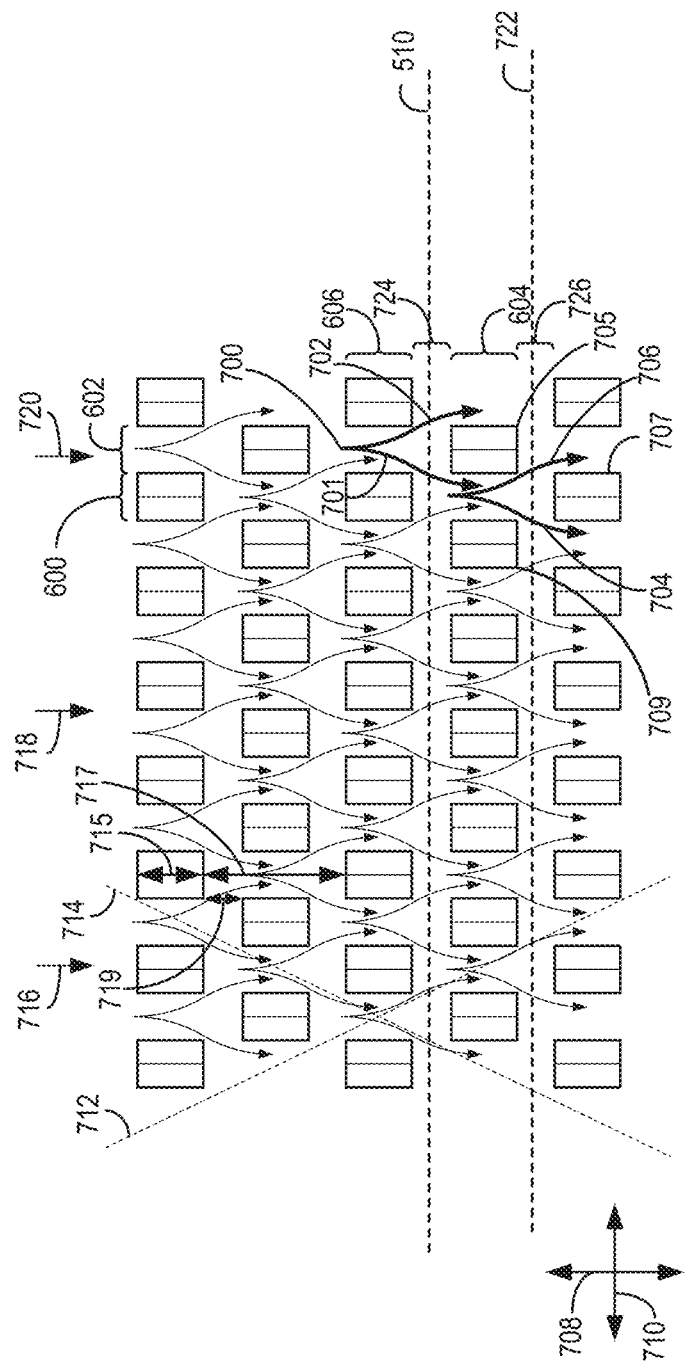
FIG. 7 shows a flattened view of the pin-fins of the stator of FIG. 2.
Figure 9:
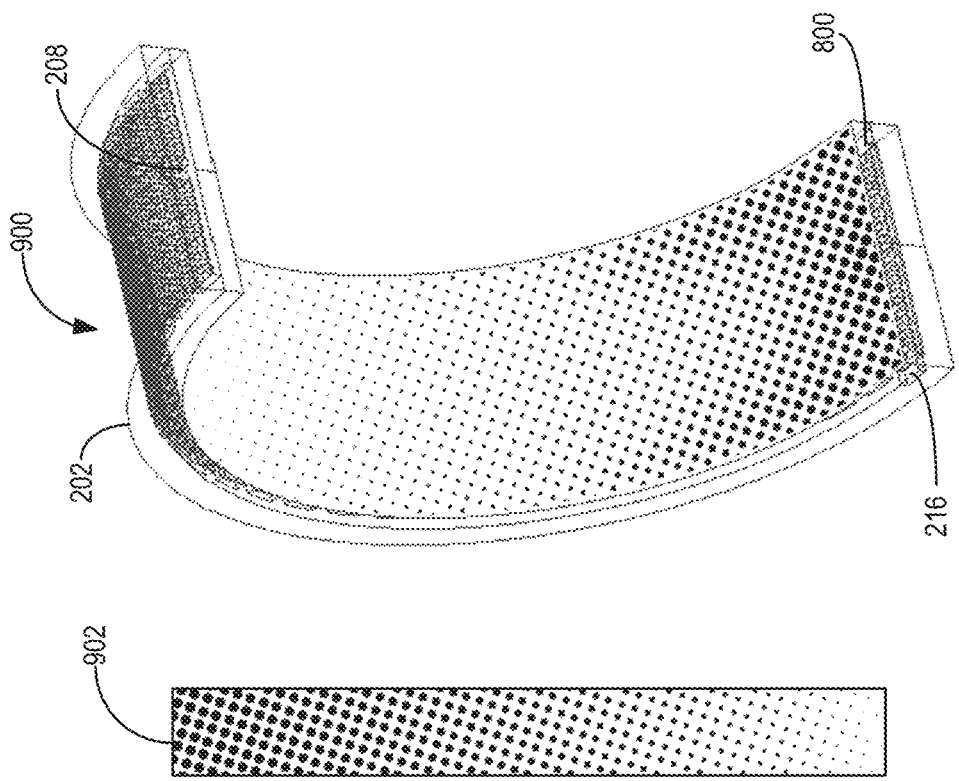
FIG. 9 shows a heat-map representing a relative temperature of portions of the stator of FIG. 2.
Figure 8:
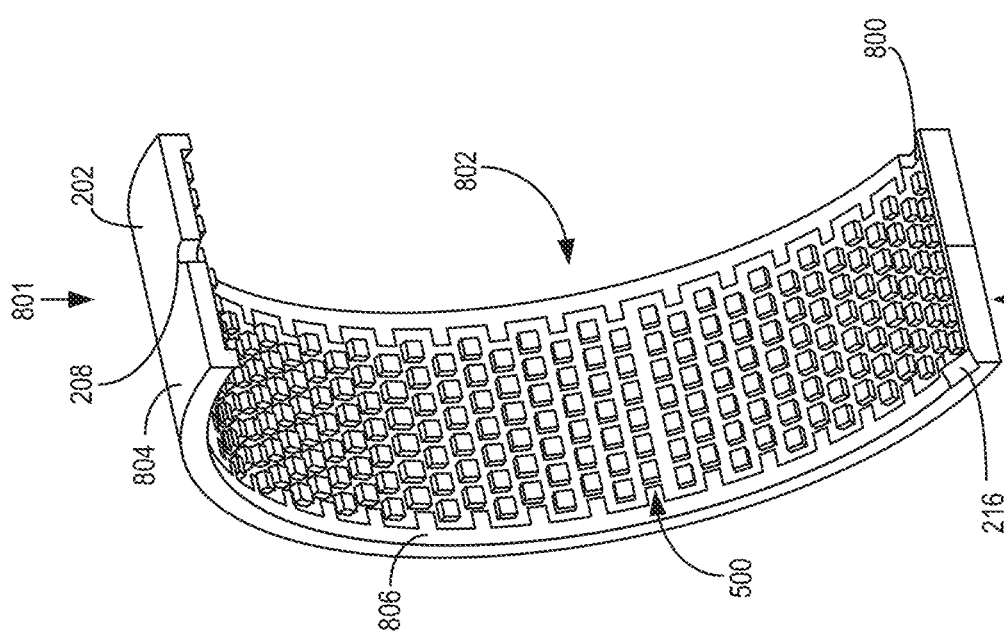
FIG. 8 shows a partial view of the pin-fins of the stator of FIG. 2 in relation to a casing of the stator.

The following disclosure relates to methods and systems for thermal management of an electric motor of a vehicle. A vehicle, such as the vehicle shown by FIG. 1, includes an electric motor with a stator, such as the stator shown by FIG. 2. The stator may be housed inside a casing, where a coolant may circulate in a space between the stator and the casing to cool the electric motor. The stator may be a laminated stator, where the stator comprises a plurality of coaxially arranged annular plates, such as the annular plate shown by FIG. 3. Each angular plate may include an inner row of radially aligned teeth, and an outer row of radially aligned protrusions. The coaxially arranged annular plates may be configured such that the inner row of teeth of each annular plate are aligned, while the outer row of protrusions are misaligned (e.g., staggered), as shown by FIG. 4. An arrangement of pin-fins that extend to the casing may be formed on an outer surface of the stator by the protrusions of each annular plate, across which the coolant flows, as shown by FIG. 5. The staggered pin-fins of the pin-fin arrangement may define a plurality of clearances through which the coolant flows, as shown by FIG. 6. The pin-fin arrangement may be configured in an overlapping quincunx configuration, as shown by FIG. 7. The quincunx configuration of pin-fins may cause the coolant to flow in different directions across surfaces of the pin-fins, as shown by FIG. 8, which may reduce a temperature of the electric motor, as shown by FIG. 9. The flow of coolant to the electric motor may be controlled according to the method illustrated by the flowchart of FIG. 10. In this way, a transfer of heat from the electric motor to the coolant may be increased by the pin-fin arrangement. The pin-fin arrangement may provide a more uniform and/or consistent transfer of heat from the stator of the electric motor to the coolant. For example, the transfer of heat to the coolant may be increased at various locations along the outer perimeter of the stator such that differences in temperature between portions of the stator are reduced, which may increase a durability and performance of the electric motor and/or reduce a likelihood of degradation of the stator and/or other components.

Figure 1:
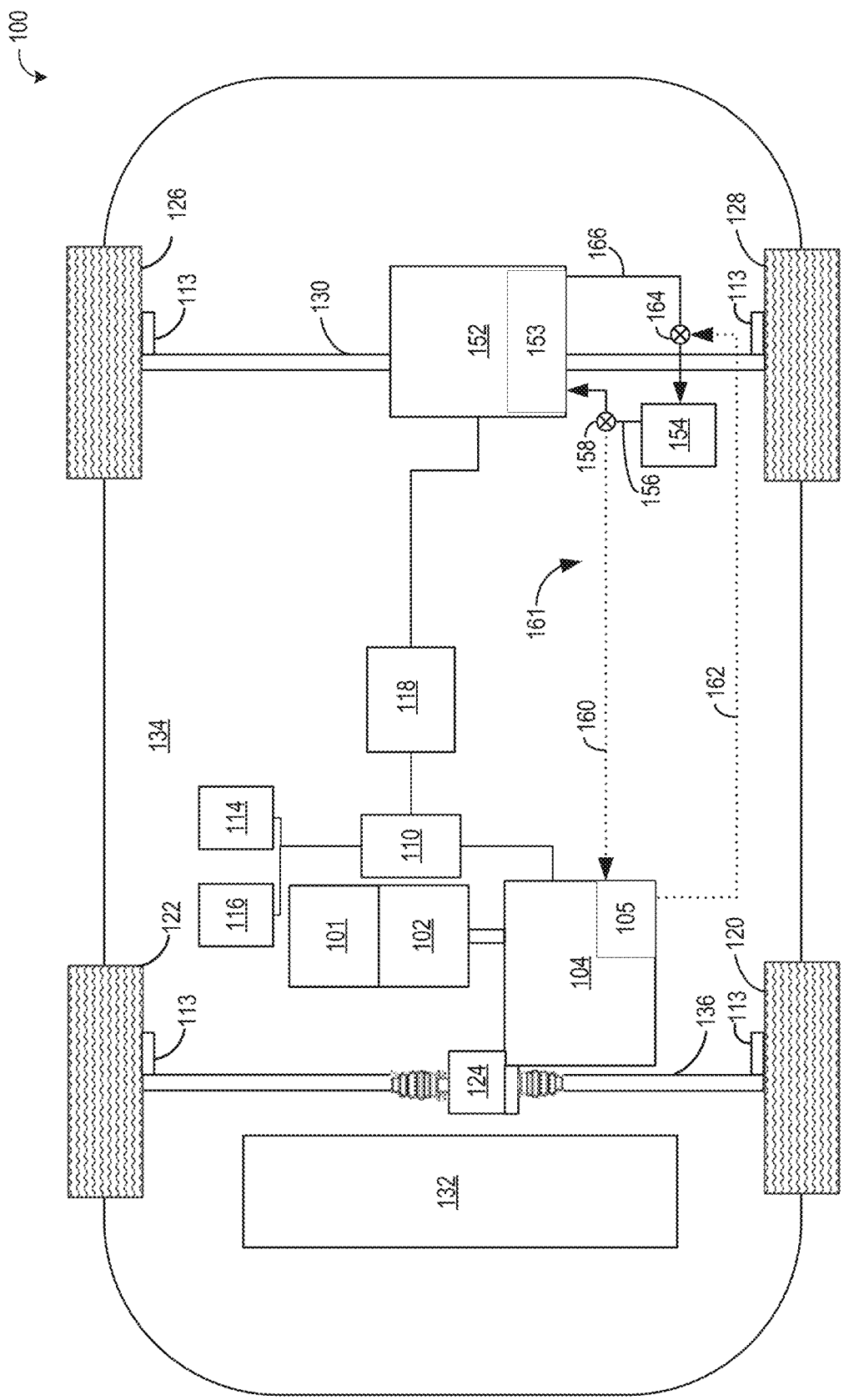
FIG. 1 schematically shows a vehicle including an electric motor.

Referring now to FIG. 1, an example vehicle 100 is shown. In some examples, vehicle 100 may be a hybrid vehicle configured to provide torque to one or more wheels from multiple sources, such as engine 101 and electric motor 102. In other examples, vehicle 100 may be configured to provide torque to the one or more wheels via only one of engine 101 or electric motor 102. Vehicle 100 may additionally include an electric axle drive unit 152 configured to drive rear wheels of the vehicle 100 coupled to rear axle 130 (e.g., either alone or in combination with engine 101 and/or electric motor 102). During conditions in which vehicle 100 is propelled by engine 101 and electric motor 102, operation of the vehicle 100 may be adjusted between various different modes in which torque is supplied to the one or more wheels via only the engine 101, via only the electric motor 102, via only the electric axle drive unit 152, or via a combination of the engine 101 and electric motor 102 and/or electric axle drive unit 152. Electric motor 102 may be a motor/generator configured to provide torque output to the one or more wheels and to generate electrical energy during operation of the vehicle 100 (e.g., via regenerative braking, as one example).

As described above, the vehicle 100 may be powered by electric motor 102 and/or engine 101, which generates torque in a drive wheel 120 when one or more clutches are engaged via a transmission 104. An output shaft of the transmission 104 may be rotatably coupled to an input of a differential gear assembly 124, which may drive one or more of a first drive wheel 120 and a second drive wheel 122 via drive axle 136. In some examples, the vehicle 100 may be additionally and/or alternatively powered by the electric axle drive unit 152, which generates torque in a drive wheel 126 and/or a drive wheel 128. For example, the vehicle 100 may be operated in an all-wheel drive mode in which the front wheels are propelled by one or both of engine 101 and electric motor 102, and the rear wheels are propelled by the electric axle drive unit 152. A drivetrain of the vehicle 100 may include components of the vehicle 100 configured to propel the vehicle 100, such as engine 101, electric motor 102, transmission 104, electric axle drive unit 152, etc.

The position or number of drive wheels on vehicle 100 should not be construed as limiting the scope of this disclosure.

Each of the wheels of the vehicle (e.g., wheel 120, wheel 122, wheel 126, and wheel 128) may include a respective wheel speed sensor (which may be referred to herein as a vehicle speed sensor), such as wheel speed sensors 113. An electronic controller 110 may receive signals (e.g., electronic signals) from the wheel speed sensors 113 and may determine a speed of the vehicle based on the signals received from the wheel speed sensors 113.

In some examples, the transmission 104 may include an electric motor 105 and may be configured as an electric variable transmission. The transmission 104 may be an automated manual transmission, whereby shifting is handled automatically by the controller 110. Further, the transmission may be adjustable between various modes of operation. For example, an operator of the vehicle (e.g., a driver) may adjust the transmission between a manual mode in which gear selection is performed by the operator via an input device (e.g., a shift lever) and an automated mode in which the gear selection is automatically determined by the controller 110 based on vehicle operating conditions (e.g., engine speed, vehicle speed, wheel torque, etc.).

The controller 110 may receive input from other sensors of vehicle 100, such as pedal position sensors, temperature sensors, pressure sensors, speed sensors, throttle sensors, battery charge sensors, air-fuel ratio sensors, etc. The controller 110 may send control signals to various actuators communicatively coupled to electric motor 102, engine 101, and/or other components of vehicle 100. The various actuators may include, for example, various valves, throttles, fuel injectors, etc. The types of sensors and actuators listed herein are for illustrative purposes and any type of sensors and/or actuators may be included without departing from the scope of this disclosure.

The electronic controller 110 may be a microcomputer, which may include a microprocessor unit, input/output ports, and an electronic storage medium for executable programs and calibration values. Controller 110 may include non-transitory computer readable medium (memory) in which programming instructions are stored, and may be programmed with computer readable data representing instructions executable to perform the methods described below, as well as other variants that are anticipated but not specifically listed. Memory as referenced herein may include volatile and non-volatile or removable and non-removable media for a storage of electronic-formatted information such as computer readable instructions or modules of computer readable instructions, data, etc. Examples of computer memory may include, but are not limited to RAM, ROM, EEPROM, flash memory, or any other medium which can be used to store the desired electronic format of information and which can be accessed by the processor or processors or at least a portion of a computing device. The controller 110 may be electrically coupled to a battery 114 and a starter 116, which may be used to provide initial power to the controller 110 and/or start the engine 101.

The electric motor 102 may be powered by a battery pack 118. Battery pack 118 may be an energy storage device configured to deliver electrical power to various components of the electrical system of the vehicle 100, including supplying current to electric motor 102 coupled to wheels 120 and/or 122 and/or the electric axle drive unit 152 coupled to wheels 126 and/or 128 of the vehicle 100. The battery pack 118 may be electrically coupled with the electric motor 102, the electric axle drive unit 152, and/or the controller 110. The controller 110 may regulate the power supply provided by the battery pack 118 to the electric motor 102 and/or the electric axle drive unit 152 in order to increase or decrease the speed of the vehicle 100.

The electric axle drive unit 152 may comprise an electric motor 153. The electric motor 153 may be cooled by a thermal management system including a coolant circuit 161 (which may be referred to herein as a coolant loop), where a liquid coolant (e.g., oil, water, refrigerant, etc.) is flowed by a pump 154 (which may be referred to herein as a coolant pump) into the electric motor 153 via an inflow line 156. The coolant may flow through the electric motor 153 to an outlet of the electric motor and may return to the pump 154 via an outflow line 166. Further, in some examples (e.g., examples in which the transmission 104 is configured as a variable electric transmission), electric motor 105 of transmission 104 may be cooled by coolant pumped by the pump 154. For example, the coolant circuit 161 may additionally include coolant line 160 configured to flow coolant from the pump 154 to the electric motor 105 of the transmission 104 and coolant line 162 configured to return coolant from the electric motor 105 to the pump 154. The flow of coolant into the electric motor 153 and/or the electric motor 105 may be controlled by the controller 110 via three-way valve 158, where three-way valve 158 fluidly couples the pump 154 to each of the electric motor 105 (via coolant line 160) and electric motor 153 (via inflow line 156). The flow of coolant out of the electric motor 105 and/or the electric motor 153 may be controlled by the controller 110 via three-way valve 164, where three-way valve 164 fluidly couples an outlet of the electric motor 105 and an outlet of the electric motor 153 to pump 154. It should be appreciated that the examples of electric motors provided herein are for illustrative purposes, and different numbers and/or types of electric motors with different configurations may be cooled by the thermal management system described herein.

Three-way valve 158 and three-way valve 164 may each be adjusted to a plurality of different positions by the controller 110. As one example, three-way valve 158 may be adjusted to a first position in which the three-way valve 158 is closed (e.g., fully close) to the electric motor 105 (e.g., three-way valve 158 does not flow coolant to the electric motor 105 via the coolant line 160) and open (e.g., fully open) to each of the pump 154 and electric motor 153 (e.g., a position in which coolant may flow from the pump 154 to the electric motor 153 through the three-way valve 158 via inflow line 156). As another example, three-way valve 158 may be adjusted to a second position in which the three-way valve 158 is open (e.g., fully open) to each of the pump 154 and the electric motor 105 (e.g., coolant may flow through the three-way valve 158 from the pump 154 to the electric motor 105 via coolant line 160) and closed (e.g., fully closed) to the electric motor 153 (e.g., coolant may not flow through the three-way valve 158 from the pump 154 to the electric motor 153 via inflow line 156). As another example, the three-way valve may be adjusted to a third position in which the three-way valve 158 is open (e.g., fully open) to each of the electric motor 105 (via coolant line 160), pump 154, and electric motor 153 (via inflow line 156). As another example, the three-way valve may be adjusted to a fourth position in which the three-way valve 158 is closed (e.g., fully closed) to each of the electric motor 105 (via coolant line 160), pump 154, and electric motor 153 (via inflow line 156). It should be appreciated that in the positions described above, where the three-way valve 158 is described as being open or closed, the three-way valve 158 may be partially open or partially closed, respectively. For example, the three-way valve 158 may be adjusted to a position similar to the third position described above, with being partially opened or fully opened to flow coolant to the electric motor 105 (via coolant line 160), and partially opened or fully opened to flow coolant from the pump 154 to the electric motor 153 (via inflow line 156). Other examples are possible. Further, although three-way valve 158 is described above, the three-way valve 164 may be adjusted to various different open and closed positions in a similar way (e.g., partially or fully opened or closed to pump 154 via outflow line 166 and/or coolant line 162).

In an example operation of the vehicle 100, the vehicle 100 may be operating in a first state in which the vehicle 100 is propelled by the electric axle drive unit 152. The pump 154 may pump a coolant (e.g., oil) into electric motor 153 at a first pressure, where the three-way valve 158 may be opened to allow the coolant to flow from the pump 154 to the electric motor 153, while preventing the coolant to flow from the pump 154 to the electric motor 105 of the transmission 104 (e.g., similar to the first position described above). Concurrently, the three-way valve 164 may be opened to allow the coolant to flow from the electric motor 153 back to the pump 154 via the outflow line 166, while preventing coolant in the coolant line 162 from flowing to the pump 154. Alternatively, the vehicle 100 may be operating in a second state in which the vehicle 100 is propelled by the engine 101 via the transmission 104. The pump 154 may pump a coolant into electric motor 105 at a second pressure, where the three-way valve 158 may be opened to allow the coolant to flow from the pump 154 to the electric motor 105 of the transmission 104, while preventing the coolant from flowing from the pump 154 to the electric motor 153 of the electric axle drive unit 152. Concurrently, the three-way valve 164 may be opened to allow the coolant to flow from the electric motor 105 back to the pump 154 via the coolant line 162, while preventing coolant in the outflow line 166 from flowing to the pump 154.

In an embodiment, the first pressure may be the same as the second pressure. In other embodiments, the first pressure may be greater or lesser than the second pressure. For example, a surface area of the electric motor 153 may be larger than a surface area of the electric motor 105, whereby greater pressure is used to circulate the coolant around the electric motor 153 than the pressure used to circulate the coolant around the electric motor 105. Alternatively, a surface area of the electric motor 153 may be smaller than a surface area of the electric motor 105, whereby lesser pressure is used to circulate the coolant around the electric motor 153 than the pressure used to circulate the coolant around the electric motor 105.

In an embodiment, the vehicle 100 may switch between the first state and the second state during operation. For example, the vehicle 100 may be a hybrid vehicle as described above, where the controller 110 may determine whether to power the vehicle 100 via the engine 101 or via the electric axle drive unit 152 based on one or more outputs of one or more sensors of the vehicle 100 (e.g., state of charge of battery, engine load, vehicle speed, etc.). Alternatively, the controller 110 may determine whether to power the vehicle 100 via the engine 101 or via the electric motor 102, and the pump 154 may be used to cool the electric motor 102 in a manner similar to the cooling of the electric motor 153. In other embodiments, the vehicle 100 may be an electric vehicle without an engine 101, and the vehicle 100 may operate in the first state and not operate in the second state, or the vehicle 100 may not include the electric axle drive unit 152, and the vehicle 100 may operate in the second state and not operate in the first state. It should be appreciated that the examples of coolant circulation and operational states provided here are non-limiting, and other operational states and/or circulation patterns may be used without departing from the scope of this disclosure.

Engine 101 may be powered by fuel such as gasoline, diesel fuel, natural gas, biofuels, or any other combustible fuel; and accordingly, the vehicle 100 may include a fuel tank connected to the engine 101 via a fuel pump and intake system. The engine 101 and/or electric motor 102 may be positioned on a chassis 134 in a variety of configurations. For example, engine 101 and electric motor 102 may be positioned proximate to each other, or engine 101 and electric motor may be positioned further apart from each other along the chassis 134. Transmission 104, electric motor 102, and/or engine 101 may be cooled by a cooling system 132 (e.g., a radiator, fan, etc.) positioned on the chassis 134 proximate electric motor 102, transmission 104, and/or engine 101.

Figure 2:
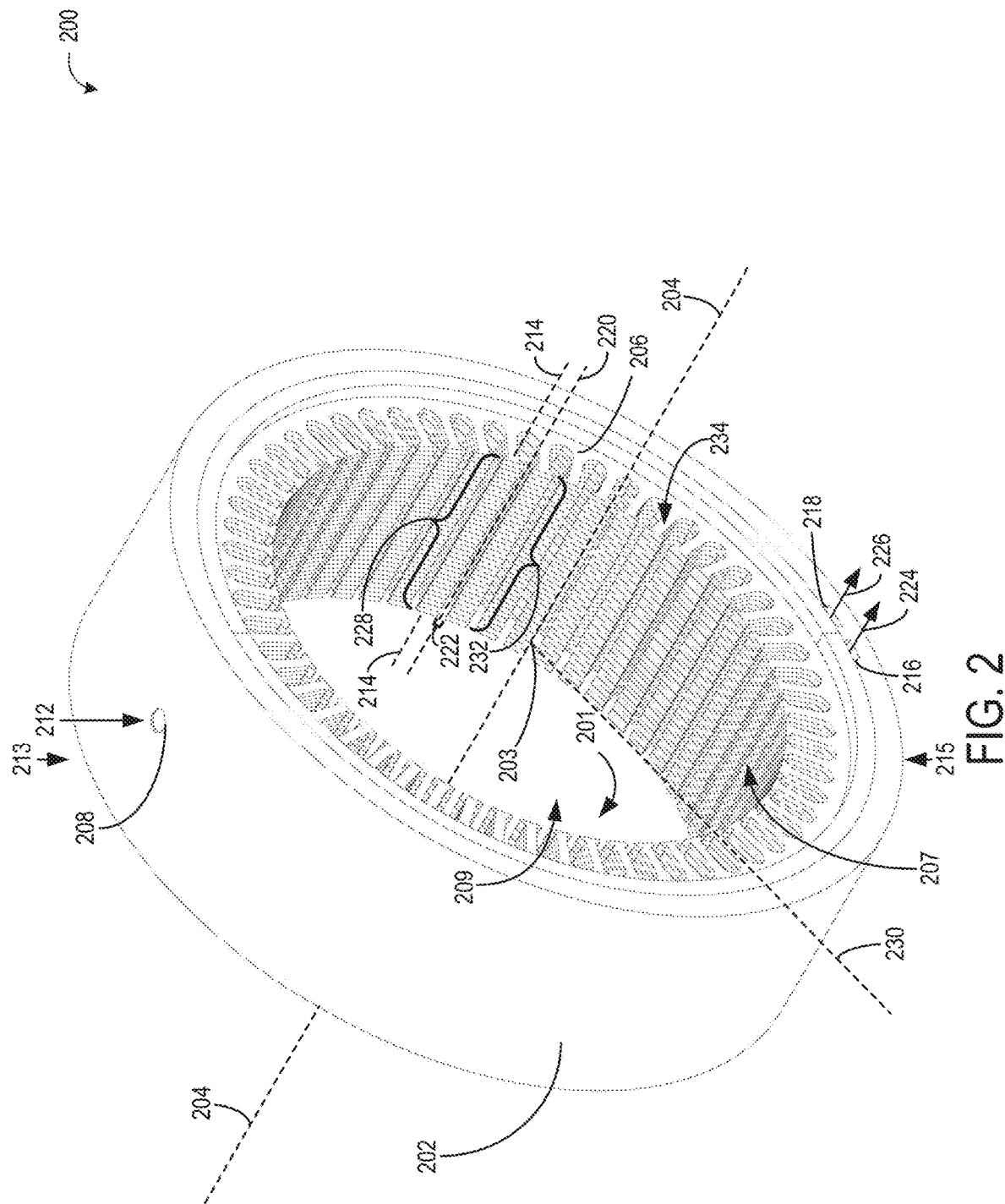
FIG. 2 shows a portion of an electric motor, including a stator and a casing.

Referring now to FIG. 2, a view of a portion of an electric motor 200 is shown. The electric motor may be an electric motor of a vehicle drivetrain, similar to, or the same as, the electric motor 153 or the electric motor 105 described above in relation to FIG. 1. The portion of the electric motor shown includes a stator 201 housed within a casing 202 (e.g., disposed within a central opening 209 of the casing 202). The stator 201 and the casing 202 may form a cylindrical shape with a central axis 204 (e.g., the central axis of the electric motor), around which the stator 201 and the casing 202 are coaxially aligned.

In an embodiment, the stator 201 may be a laminated stator formed by a plurality of annular plates 207, such as annular plate 206, where a midpoint of a central opening 203 of each of the annular plates is arranged along the central axis 204. Each annular plate of the plurality of annular plates 207 may include a plurality of radially-aligned inner teeth 234 circling the midpoint of the central opening 203. The annular plates 207 are axially aligned along the central axis 204 and positioned in face-sharing contact with each other (e.g., each plate is in face-sharing contact with each adjacent plate), whereby the annular plates 207 are directly in contact with each other, with no other components therebetween. The inner teeth 234 of the plates may extend radially inward (e.g., in a radial direction from the central axis 204, such as the direction indicated by radial axis 230). Each annular plate may have the same number of inner teeth 234, and the inner teeth of each annular plate may be axially aligned with teeth of each other plate to form a plurality of axial rows of teeth, separated by lines formed by axially aligned recessed surfaces between the teeth of each plate. In an embodiment, each annular plate may have 50 teeth.

As one example, a first row 228 of the inner teeth 234 may be aligned along an axis 214 parallel to central axis (e.g., each tooth of the first row 228 is intersected by axis 214). For each row, the teeth may be in the same rotational position around the central axis 204, where the teeth are aligned with each other and are not staggered around the central axis. In this configuration, a plurality of lines (e.g., clearances) are formed. Each line is arranged between a pair of rows of inner teeth 234, such that each row of teeth is separated (e.g., spaced apart) from each other row of teeth by the lines. For example, a second row 232 is spaced apart from the first row 228 by a line 222, where an axis 220 extends through the line 222, parallel with the central axis, without intercepting any of the teeth of first row 228 or second row 232.

By forming the stator 201 from the plurality of annular plates 207, electrical eddy currents may be reduced. In other examples, the stator 201 may include a different number of plates than depicted in FIG. 2, or the stator 201 may be formed as a single, unitary piece including the plurality of inner teeth 234.

During operation of the electric motor, the stator 201 may be cooled via a liquid coolant that is flowed into a space between the stator 201 and the casing 202. In this way, heat generated in the stator 201 may be transferred away from the stator 201 via the coolant. In some examples, the coolant may be oil. In other examples, the coolant may be water, or another type of fluid which is a dielectric. The casing 202 may be sealed such that coolant flows between the casing 202 and outer perimeter surfaces (e.g., outer circumferential surfaces) of the stator 201, but does not flow across the teeth or through the central opening 203 of the stator. In some examples, the annular plates of the stator 201 may be sealed together (e.g., glued together and/or impregnated with sealant), reducing a likelihood of flow of the oil between the plates to the interior of the stator 201. The casing 202 includes an inlet opening 208 (which may be referred to herein as a coolant inlet), through which the coolant may flow into the space between the casing 202 and the stator 201. The space between the casing 202 and the outer surfaces (e.g., outer circumferential surfaces) of the stator 201 may be referred to herein as a coolant jacket.

The casing 202 includes at least one outlet opening, such as first outlet opening 216 and second outlet opening 218 (which may be referred to herein as coolant outlets), through which coolant may flow out of the space between the casing 202 and the stator 201 (e.g., back to a pump such as pump 154 of vehicle 100 of FIG. 1). In some examples, the casing 202 may include four outlet openings, with two outlet openings positioned at each opposing side of the casing 202 in the direction of central axis 204. The inlet opening 208 is arranged opposite to the outlet openings (e.g., first outlet opening 216 and second outlet opening 218) in a direction across the central axis 204 (e.g., in a direction of gravity across the central axis 204, from a top end 213 of the casing 202 and stator 201 to a bottom end 215 of the casing 202 and stator 201). The inlet opening 208 may be referred to herein as a coolant inlet, and the outlet openings (e.g., first outlet opening 216, second outlet opening 218, etc.) may be referred to herein as coolant outlets. The coolant may flow in a direction indicated by flow arrow 212 down from the inlet opening 208 (e.g., down with respect to a direction of gravity, from a top of the casing 202 to a bottom of the casing 202), around the outer perimeter of the stator 201 in each circumferential direction, and out of the first outlet opening 216 and/or the second outlet opening 218 in directions corresponding to flow arrow 224 and flow arrow 226, respectively. The flow of coolant may be controlled by a controller (e.g., controller 110 described above with reference to FIG. 1) via a pump, such as pump 154 of vehicle 100 of FIG. 1. The flow of coolant around the stator 201 is described in greater detail below in relation to FIGS. 5-9.

Figure 3:
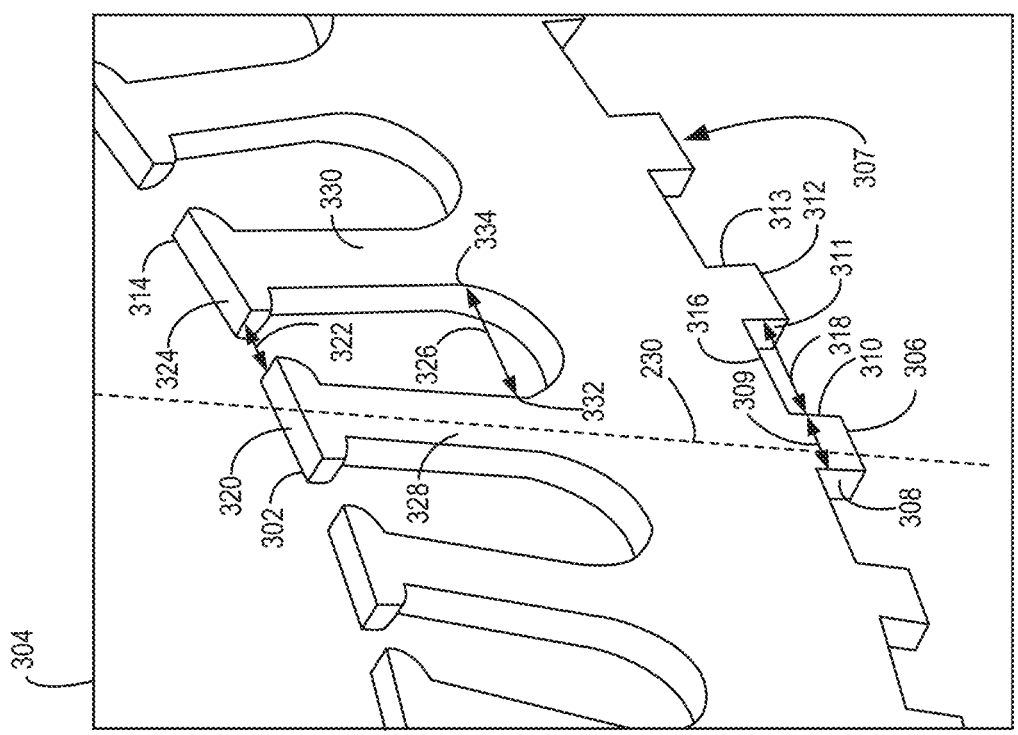
FIG. 3 shows an annular plate of the stator of FIG. 2.
Figure 3:
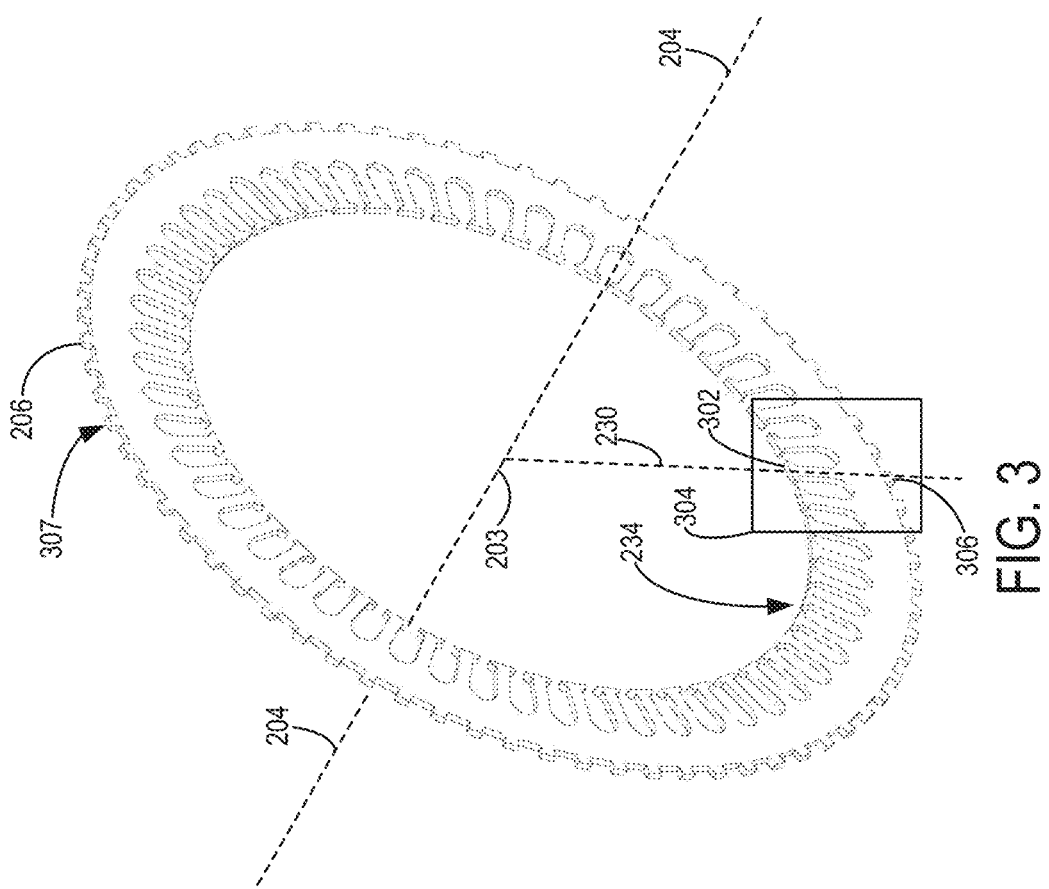

Referring now to FIG. 3, a perspective view of the annular plate 206 of the stator 201 is shown isolated from the stator 201. Annular plate 206 includes inner teeth 234 arranged along the inner perimeter of the annular plate 206. The inner teeth 234 of each annular plate are arranged in a same configuration around the central axis 204 relative to each other annular plate, as described above with reference to FIG. 2 (e.g., for each annular plate, the inner teeth 234 are arranged in the same angular position around the central axis 204 such that a plurality of rows of the inner teeth 234 are formed by the annular plates as described above). The inner teeth 234 may be evenly spaced around the inner perimeter of each annular plate (e.g., annular plate 206). The annular plate 206 additionally includes a plurality of outer protrusions 307 along an outer perimeter (e.g., outer circumferential surface) of annular plate 206, which extend in a direction of an inner circumferential surface of the casing 202 of FIG. 2 and as described further below. An inset 304 shows a portion of the annular plate 206 including a first inner tooth 302 of the plurality of inner teeth 234 and a first protrusion 306 of the plurality of outer protrusions 307.

In some examples, the annular plate 206 may be a single, unitary piece formed (e.g., stamped, molded, etc.) from a metal material (e.g., iron, steel, etc.) that may conduct heat between the inner teeth 234 and the outer protrusions 307.

In particular, the inner teeth 234 and outer protrusions 307 may be formed integrally with the annular plate 206 as a single, continuous unit (e.g., molded together without fasteners or other couplings, stamped together as a single unit from a same layer of material, etc.). By forming the annular plate 206 together with the respective inner teeth 234 and respective protrusions 307 as a single unit, an amount of heat transferred from the inner teeth 234 to the protrusions 307, and the pin-fins formed by the protrusions 307, may be increased. The increased heat transfer from the inner teeth 234 to the pin-fins may increase a cooling of the stator 201 by increasing an efficiency of the heat transfer from the stator 201 to the coolant (e.g., increasing the transfer of heat from the inner teeth 234 to the coolant via the pin-fins formed by the protrusions 307). Additionally, by forming the annular plate 206 together with the respective inner teeth 234 and respective protrusions 307 as a single unit, the pin-fins are integrated with the stator 201 to provide cooling of the stator 201 without additional heat sinks or other cooling components. As a result, a manufacturing time and/or complexity of the electric motor may be reduced, and a size of the electric motor may be reduced (which may provide additional space for other components of the vehicle).

During conditions in which the electric motor is in operation, heat may be generated at the inner teeth 234 due to energization of the electric motor (e.g., during rotation of a rotor arranged within the central opening 203), and the heat may transfer from the inner teeth 234 to the outer protrusions 307 (e.g., the increasing temperature of the inner teeth 234 may increase the temperature of the outer protrusions 307). To cool the electric motor, coolant flowing to the electric motor may extract heat from the outer protrusions 307, which may decrease a temperature of the teeth and other portions of each annular plate, in turn decreasing a temperature of the electric motor. In some examples, the annular plate 206 may be a single, unitary piece formed from a different metal (e.g., copper, etc.), or the annular plate 206 may be a composite piece formed by pieces of one or more metals or materials with different conductive properties. In some examples, the teeth of the annular plate 206 may be formed out of a first material, and a remainder of the annular plate 206 including the protrusions may be formed out of a second material, where the first material may be selected based on a first conductive property and the second material may be selected based on a second conductive property. For example, the first material may be selected based on a conductive property for transferring heat from air inside the stator 201 to the first material, and the second material may be selected based on a conductive property for transferring heat from the second material to the coolant. It should be appreciated that the examples of materials disclosed herein are for illustrative purposes, and the annular plate 206 may be formed from other materials without departing from the scope of this disclosure.

As shown in the enlarged view of the inset 304, the first inner tooth 302 has a radial extension 328 aligned along the radial axis 230, and an end surface 320 facing the midpoint of the central opening 203 of the annular plate 206 where the radial axis 230 meets the central axis 204. As described above, the inner teeth may be spaced evenly around the inner perimeter of the annular plate 206. For example, the first inner tooth 302 may be separated from a second inner tooth 314, with a radial extension 330 and an end surface 324, by a first length 322 and a second length 326, where the first length 322 is the length of the space between an edge of the end surface 320 of the first inner tooth 302 and an adjacent edge of the end surface 324 of the second inner tooth 314, and the second length 326 is the length of the space between a base portion 332 of the first inner tooth 302 and a base portion 334 of the second inner tooth 314. The first length 322 and the second length 326 may be the same for each pair of adjacent teeth of the same annular plate, whereby the inner teeth 234 are spaced evenly around the inner perimeter of the annular plate 206.

The outer protrusions 307 of the annular plate 206 are spaced evenly around the outer perimeter (e.g., outer circumferential surface) of the annular plate 206. For example, the first protrusion 306 has a length 309 in the circumferential direction and includes a first side surface 308 and a second side surface 310. The first protrusion 306 is separated from an adjacent second protrusion 312 of the annular plate 206, with the second protrusion 312 having a same length as the first protrusion 306 (e.g., length 309) and with the second protrusion 312 including a first side surface 311 and a second side surface 313. The first protrusion 306 and second protrusion 312 are separated (e.g., spaced apart) by a recessed surface 316. The recessed surface 316 may have a length 318, where the length 318 is the length of the space between the second side surface 310 of the first protrusion 306 and the first side surface 311 of the second protrusion 312 in the circumferential direction. The length 318 may be the same for each pair of adjacent protrusions of the same annular plate, such that each outer protrusion of the plurality of outer protrusions 307 of the annular plate 206 is spaced apart from each adjacent protrusion of the plurality of outer protrusions 307 of the annular plate 206 by an equal amount. In some examples, the length 318 may be greater than the length 309 of each protrusion.

The annular plates comprising the laminated stator 201 of FIG. 2 may be axially aligned as described with reference FIG. 2, such that each of the annular plates includes the teeth in the same axial position relative to each other annular plate around the central axis. However, the outer protrusions at the outer perimeter of each annular plate may not be axially aligned relative to the outer protrusions of other annular plates of the stator 201. In particular, a first subset, or first group, of the annular plates may include the outer protrusions in a first arrangement, while a second subset, or second group, of the annular plates may include the outer protrusions in a different, second arrangement. By configuring adjacent annular plates to have different arrangements of the outer protrusions, the outer protrusions are staggered to form a plurality of clearances between the protrusions, with the clearances adapted to receive the coolant flow.

In the example shown by FIG. 2, the stator 201 includes thirty-six annular plates housed within the casing 202. Each annular plate includes fifty-five inner teeth (e.g., inner teeth 234), which when axially aligned, form fifty-five rows of inner teeth (e.g., first row 228, second row 232, etc.). Coils of conductive wire may be wound around the inner teeth and energized to produce an electric field. Further, each annular plate includes seventy-two outer protrusions (e.g., outer protrusions 307) spaced evenly around the annular plate outer perimeter, where the length of each protrusion may be less than the distance between the protrusions of each plate (e.g., the length 309 of the first protrusion 306 may be less than the length 318 of the recessed surface 316). The outer protrusions of the annular plates are offset in the circumferential direction (e.g., the direction around the central axis 204) with respect to adjacent annular plates. In this configuration, the outer protrusions arranged along the outer perimeter of a given annular plate (e.g., annular plate 206 shown by FIG. 3) are misaligned relative to outer protrusions arranged along the outer perimeter of an adjacent annular plate, such each outer protrusion of the given annular plate is axially aligned with a midpoint of a respective recessed surface of the adjacent annular plate (e.g., similar to recessed surface 316 described above). The arrangement of the annular plates 207 and the axial misalignment of the outer protrusions 307 results in a staggered arrangement of the outer protrusions along the outer perimeter of the stator 201 (e.g., along outer circumferential surfaces of the stator 201, such as outer circumferential surfaces 514 shown by FIG. 5). In this configuration, coolant (e.g., oil) provided to the electric motor may flow through clearances disposed between the outer protrusions 307 of adjacent annular plates of the plurality of annular plates 207 (e.g., across the recessed surfaces of each of the annular plates 207, such as recessed surface 316). By flowing the coolant across the surfaces of the outer protrusions and through the clearances, a conductive surface area between the stator and the coolant may be increased, which may increase an efficiency of heat transfer between the stator and the coolant. Although the annular plate 206 includes fifty-five inner teeth and seventy-two outer protrusions, it should be appreciated that in other examples, the annular plates may have a different number of inner teeth (e.g., fifty inner teeth, forty inner teeth, etc.) and/or outer protrusions (e.g., sixty outer protrusions, ninety outer protrusions, etc.). Further, although the stator 201 includes thirty-six annular plates in the example shown, in other examples the stator may include a different number of annular plates (e.g., thirty annular plates, forty annular plates, etc.).

In the examples shown, the outer protrusions have a rectangular cuboid shape (e.g., rectangular cross-sectional profile). In other examples, the outer protrusions may have a different shape (e.g., with an oval, semi-circular, circular or other cross-sectional profile). For example, the outer protrusions may have a rounded corner radius. In still further examples, the protrusions may have a shape that is non-symmetrical. For example, some surfaces of the protrusions may include rounded corners while other surfaces of the protrusions may include square corners. In an embodiment, the protrusions may have rounded corners facing a direction of the coolant flow, and squared corners facing in the opposite direction of the coolant flow, which may alter the flow of coolant around the protrusions. In another embodiment, the annular plates may grouped in pairs, where staggered pin-fins may be formed by adjacent pairs of protrusions, and where having a cross-sectional profile of each staggered pin-fin with rounded corners may entail each protrusion of the pair of protrusions having rounded corners on an outward facing surface of the protrusion and squared corners on an inward facing surface of the protrusion. An example of a pin-fin arrangement based on pairs of protrusions of adjacent annular plates is described below in relation to FIGS. 4-9.

Referring now to FIG. 4, various annular plates of the electric motor described above with reference to FIG. 2 are shown in an exploded view. In an embodiment, six annular plates are arranged in three pairs coaxially aligned around the central axis of the stator (e.g., central axis 204, shown by FIG. 2). The central axis may be referred to herein as an assembly axis. A first pair 440 of annular plates includes annular plate 206 of FIG. 2 and annular plate 400; a second pair 434 of annular plates comprises annular plate 402 and annular plate 404; and a third pair of annular plates 420 comprises annular plate 406 and annular plate 408. The annular plates may be positioned in face-sharing contact with each other.

As described above in reference to annular plate 206, each annular plate includes inner teeth arranged along the inner perimeter and outer protrusions arranged along the outer perimeter, with recessed surfaces arranged between the outer protrusions in the circumferential direction. For each given pair of annular plates, the inner teeth of both annular plates of the given pair are axially aligned, and the outer protrusions of both annular plates of the given pair are axially aligned. For example, in the first pair 440 of annular plates, the outer protrusions of both annular plates are axially aligned with each other in a first arrangement. Both annular plates of the second pair 434 of annular plates includes outer protrusions axially aligned with each other in a second arrangement, where the second arrangement is offset relative to the first arrangement in the circumferential direction. Both annular plates of the third pair 420 of annular plates have the same arrangement as the first pair of annular plates.

The second pair 434 of annular plates is positioned in face-sharing contact with annular plates of each of the first pair 440 of annular plates and the third pair 420 of annular plates in a coaxial alignment along the central axis, whereby the inner teeth of the annular plates of the first pair 440, second pair 434, and third pair 420 of annular plates are axially aligned to form plurality of rows that span the coaxially aligned annular plates, as described above in reference to FIG. 2. For example, an axis 414 parallel to the central axis is shown as intersecting the coaxially aligned inner teeth of annular plate 206 and annular plate 400 of first pair 440, annular plate 402 and annular plate 404 of second pair 434, and annular plate 406 and annular plate 408 of third pair 420, along the inner perimeter of the annular plates. Each inner tooth of the plurality of the inner teeth is positioned in direct face-sharing contact with at least one axially adjacent inner tooth of the plurality of inner teeth. In contrast, the outer protrusions of the annular plates of first pair 440 of annular plates, second pair 434 of annular plates, and third pair 420 of annular plates may not be axially aligned across the pairs, whereby the protrusions of the plates of one pair may be axially aligned with the recessed spaces of the plates of an adjacent pair. Thus, the arrangement of the protrusions across pairs of plates may alternate between the first arrangement and second arrangement described above. In particular, the outer protrusions of both annular plates of the first pair 440 are axially misaligned with the outer protrusions of both annular plates of the second pair 434, but are axially aligned with the outer protrusions of both annular plates of the third pair 420 of annular plates.

For example, FIG. 3 shows axis 412 parallel to the central axis. Axis 412 intersects outer protrusion 436 of annular plate 206 of the first pair 440 and axially aligned outer protrusion 438 of annular plate 400 of the first pair 440. However, axis 412 does not intersect the outer protrusions of either of the annular plates of the second pair 434 of annular plates. Instead, axis 412 extends through a space formed between outer protrusions of the annular plate 402 and annular plate 404 of the second pair 434, with the space defined at least in part by recessed surface 430 of annular plate 402 between outer protrusion 422 and outer protrusion 428, and an axially aligned recessed surface 426 of annular plate 404 between outer protrusion 424 and outer protrusion 432. With respect to the third pair 420 of annular plates, axis 412 intersects outer protrusion 418 of annular plate 406 and an axially aligned outer protrusion 416 of annular plate 408. Similarly, axis 410 parallel to the central axis is shown, where the axis 410 extends through a space between outer protrusions of annular plate 206 and annular plate 400 of the first pair 440, with the space bounded at least in part by recessed surfaces of the annular plates of the first pair 440. The axis 410 additionally extends through a space between outer protrusions of annular plate 406 and annular plate 408 of the third pair 420, with the space bounded at least in part by recessed surfaces of the annular plates of the third pair 420. However, with respect to the second pair 434 of annular plates, the axis 410 intersects with outer protrusions of annular plate 402 and annular plate 404 of the second pair 434.

Thus, the protrusions of the first pair 440 of annular plates are not axially aligned with the protrusions of the second pair 434 of annular plates, but the protrusions of the first pair 440 are axially aligned with the protrusions of the third pair 420. The aligned protrusions of the first pair 440 together form a plurality of pin-fins, where each pin-fin includes one outer protrusion of each annular plate of the first pair 440 (e.g., annular plate 206 and annular plate 400), such that each pin-fin is formed by two axially adjacent outer protrusions (e.g., one outer protrusion of the annular plate 206 and one axially adjacent outer protrusion of the annular plate 400). In this way, the alternating pin-fin arrangements of the pairs of annular plates may create a staggered pin-fin arrangement in an overlapping quincunx configuration across the outer surface of the stator formed by the outer perimeters of each coaxially aligned annular plate. An example arrangement of pin-fins in a quincunx configuration is described in greater detail below in relation to FIGS. 6 and 7.

The arrangement of pin-fins across the surface of the stator is a result of the alternating axial alignment and misalignment of the outer protrusions and the alternating axial alignment and misalignment of the recessed surfaces of the individual plates and/or pairs of plates. In some examples, the annular plates may be configured in an alternating arrangement without being in pairs, such that each outer protrusion of each plate forms one pin-fin, instead of each pin-fin being formed by a pair of outer protrusions. In such examples, the outer protrusions may have the same shape as shown, or the outer protrusions may have a semi-circular or rounded shape or cross-section, as described above. Further, the pin-fins are configured to be in the staggered arrangement such that the pin-fins are not axially aligned between adjacent annular plates. For example, a given annular plate may include outer protrusions in the first arrangement, where each of the outer protrusions in the first arrangement forms a corresponding pin-fin, and an adjacent annular plate (e.g., adjacent to the given annular plate) may include outer protrusions in the second arrangement, where each of the outer protrusions in the second arrangement forms a corresponding pin-fin. In this configuration, the pin-fins of the given plate are axially misaligned with the pin-fins of the adjacent plate such that the pin-fins of each annular plate are staggered (e.g., offset from each other in the circumferential direction).

As described above, the annular plates 207 may include outer protrusions in a first arrangement (e.g., similar to annular plate 206 and annular plate 400 of first pair 440) or a second arrangement (e.g., similar to annular plate 402 and annular plate 404 of second pair 434), where the outer protrusions in the first arrangement are offset in the circumferential direction relative to the outer protrusions in the second arrangement (e.g., the outer protrusions in the first arrangement are axially misaligned with the outer protrusions in the second arrangement). The plurality of annular plates 207 includes by the stator 201 includes annular plates in the first arrangement and additionally includes annular plates in the second arrangement. The annular plates including the outer protrusions in the first arrangement are positioned in face-sharing contact in an alternating arrangement with the annular plates including the outer protrusions in the second arrangement. For example, in the view shown by FIG. 4, the first pair 440 of annular plates includes annular plate 206 and annular plate 400 with outer protrusions in the first arrangement, the second pair 434 of annular plates includes annular plate 402 and annular plate 404 with outer protrusions in the second arrangement, and the third pair 420 of annular plates includes annular plate 406 and annular plate 408 with outer protrusions in the first arrangement.

A first group of the annular plates 207 may include only annular plates having outer protrusions in the first arrangement, and a second group of the annular plates 207 may include only annular plates having protrusions in the second arrangement. For example, the first group may include at least annular plate 400 and annular plate 406 (e.g., annular plates with the outer protrusions in the first arrangement), while the second group may include at least annular plate 402 and annular plate 404 (e.g., annular plates with the outer protrusions in the second arrangement). During conditions in which the annular plates are assembled together to form the stator 201 shown by FIG. 2, each annular plate included by the first group is adjacent to at least one annular plate included by the second group, such that each of the annular plates including outer protrusions in the second arrangement is adjacent to at least one of the annular plates including outer protrusions in the first arrangement. The pin-fins in the first arrangement (e.g., first circumferential arrangement) may be referred to herein as a first group of pin-fins, and the pin-fins in the second arrangement (e.g., second circumferential arrangement) may be referred to herein as a second group of pin-fins. The annular plates in the first group, with the outer protrusions in the first arrangement (e.g., first circumferential arrangement), form each of the pin-fins in the first arrangement, and the annular plates in the second group, with the outer protrusions in the second arrangement (e.g., second circumferential arrangement), form each of the pin-fins in the second arrangement. In particular, each pin-fin in the first arrangement (e.g., the pin-fins in the first group of pin-fins) is formed by outer protrusions in the first arrangement (e.g., the outer protrusions included by the annular plates of the first group of annular plates), and each pin-fin in the second arrangement (e.g., the pin-fins in the second group of pin-fins) is formed by outer protrusions in the second arrangement (e.g., the outer protrusions included by the annular plates of the second group of annular plates).

As described above, the first pair 440, second pair 434, and third pair 420 of annular plates are shown in an exploded view in FIG. 4, and may be assembled in contact with each other along the central axis 204 (shown by FIGS. 2-3). In particular, annular plate 402 may be in direct, face-sharing contact with annular plate 400, and annular plate 404 may be in direct, face-sharing contact with annular plate 406 (e.g., annular plate 404 may be positioned directly in contact with annular plate 406, with no other components therebetween). In this assembled configuration, the arrangement of the pin-fins formed by the outer protrusions of the annular plates is staggered, such that the pin-fins are not both adjacent and in axial alignment with each other. For example, the pin-fin formed by the outer protrusion 436 and outer protrusion 438 is not axially aligned with any of the pin-fins formed by the outer protrusions of the annular plates of the second pair 434 (e.g., annular plate 402 and annular plate 404). Although pin-fin 415 formed by the outer protrusion 436 and outer protrusion 438 is axially aligned with pin-fin 417 formed by the outer protrusion 416 and the outer protrusion 418 (e.g., both of pin-fin 415 and pin-fin 417 are intersected by the axis 412), the pin-fin 415 formed by the outer protrusion 436 and outer protrusion 438 is not axially adjacent to the pin-fin 417 formed by the outer protrusion 416 and the outer protrusion 418. Instead, the pin-fin 415 is spaced apart from the pin-fin 417 in the axial direction by the recessed surface 426 of the annular plate 402 and the recessed surface 430 of the annular plate 404 (although each pin-fin of the first group of pin-fins is axially aligned with other pin-fins of the first group of pin-fins). Similarly, each pin-fin formed by outer protrusions of annular plates of the second pair 434 of annular plates is axially misaligned with pin-fins formed by outer protrusions of annular plates of the first pair 440 of annular plates and pin-fins formed by outer protrusions of annular plates of the third pair 420 of annular plates. Although the pin-fins formed by outer protrusions of annular plates of the second pair 434 of annular plates are axially aligned with other pin-fins of other annular plates of the stator 201 including outer protrusions arranged in the second arrangement (e.g., each pin-fin of the second group of pin-fins is axially aligned with other pin-fins of the second group of pin-fins), the pin-fins of the second pair 434 of annular plates are not axially adjacent to the pin-fins to which they are axially aligned (e.g., the pin-fins of the annular plates of the second pair 434 of annular plates are axially spaced apart from the other pin-fins to which they are axially aligned).

The first group of pin-fins may include the pin-fins formed by first pair 440 of annular plates and third pair 420 of annular plates, while the second group of pin-fins may include the pin-fins formed by second pair 434 of annular plates. Although FIG. 4 shows the first pair 440, second pair 434, and third pair 440 of annular plates that are included by the stator 201 (shown by FIG. 2), it should be appreciated that the stator may include additional annular plates having pin-fins in the first arrangement and second arrangement. In particular, third pair 420 of annular plates may be arranged adjacent to a fourth pair of annular plates that includes pin-fins in the second arrangement (e.g., in the second group of pin-fins, similar to the pin-fins of second pair 434 of annular plates), the fourth pair of annular plates may be arranged adjacent to a fifth pair of annular plates that includes pin-fins in the first arrangement (e.g., in the first group of pin-fins, similar to the pin-fins of the first pair 440 and third pair 420 of annular plates), and so forth, with the pairs of annular plates including the pin-fins in the first arrangement alternating with the pairs of annular plates including the pin-fins in the second arrangement along the central axis. Further, each annular plate of the second group of annular plates (e.g., the annular plates including the pin-fins of the second group of pin-fins, with the pin-fins in the second arrangement) is in an alternating arrangement with each annular plate of the first group of annular plates (e.g., the annular plates including the pin-fins of the first group of pin-fins, with the pin-fins in the first arrangement), such that each annular plate of the second group of annular plates is adjacent to at least one annular plate of the first group of annular plates.

By configuring the stator 201 to include the pin-fins in the staggered arrangement via the annular plates, with the annular plates having the pin-fins in the first arrangement alternating with the annular plates having the pin-fins in the second arrangement, a cost and/or complexity of manufacturing of the stator 201 may be reduced. In particular, the stator 201 may be formed from the annular plates having the two different configurations (e.g., the annular plates with the pin-fins in the first arrangement and the annular plates with the pin-fins in the second arrangement) without complex molding, machining, etc. of the stator 201 and without additional components to form the pin-fins.

Referring now to FIG. 5, the stator 201 from FIG. 2 is shown with the casing 202 removed, exposing an arrangement of pin-fins 500 around the outer surface (e.g., outer perimeter) of the stator 201. As described above, the stator 201 comprises the plurality of annular plates 207, including annular plate 206, with the inner teeth 234 of each annular plate being axially aligned with the inner teeth of each adjacent annular plate. The relative arrangement of annular plate 206, annular plate 400, annular plate 402, annular plate 404, annular plate 406, and annular plate 408 described above with reference to FIG. 4 is shown for comparison with the other views described herein. As described above in reference to FIG. 4, the staggered arrangement of pin-fins around the outer surface of the stator 201 is provided by the configuration of the annular plates. In particular and as described above, the annular plates include outer protrusions in the first arrangement and the second arrangement, with the position of the outer protrusions in the second arrangement being offset in the circumferential direction around the central axis relative to the outer protrusions in the first arrangement. Each of the annular plates having the outer protrusions in the second arrangement are immediately adjacent at least one annular plate with the outer protrusions in the first arrangement (e.g., adjacent, with no other components or annular plates positioned in between). Axis 412, parallel to the central axis 204, intersects with the protrusions of some of the annular plates (e.g., the annular plates including outer protrusions in the first arrangement), while not intersecting with the outer protrusions of other annular plates (e.g., the annular plates including outer protrusions in the second arrangement), as shown in FIG. 4. Axis 508 and axis 510, also parallel to the central axis 204, show an axial alignment of protrusions that generates the pin-fin arrangement, as described in greater detail below in reference to an enlarged view of inset 504 shown by FIG. 6.

In an embodiment, coolant flows around the stator 201 through passages created by the pin-fin arrangement to facilitate a transfer of heat generated in the stator 201 to the coolant. The coolant may flow into the cavity or space between the stator 201 and the casing 202, which may be referred to herein as the coolant jacket. The pin-fins extend in a radial direction of the central axis 204 into the coolant jacket from the outer perimeter (e.g., outer circumferential surfaces 514) of the stator 201. In particular, the pin-fins (and the protrusions forming the pin-fins) extend straight outward (e.g., linearly, without curving, skewing, tilting, bending, etc.), radially relative to the central axis 204, from the outer perimeter of the stator 201 and normal (e.g., orthogonal) to the outer circumferential surfaces 514 of the stator 201 around the entire outer perimeter of the stator 201. The coolant may flow into the coolant jacket via an inlet of the casing 202 (e.g., the inlet opening 208 of FIG. 2). As the coolant flows into the coolant jacket, the coolant may be urged by gravity (e.g., urged in the direction of gravity 512) to flow between the casing 202 and the stator 201 from a first end 511 of the stator 201 (e.g., the top end of the stator relative to the direction of gravity 512) to an opposite, second end 513 of the stator 201 (e.g., the bottom end of the stator 201 relative to the direction of gravity 512). The coolant, urged by gravity, may flow in a first circumferential direction 502 and an opposing, second circumferential direction 506 from the first end 511 (e.g., at the location of the inlet opening 208, shown by FIG. 2) toward the second end 513 of the stator 201. The coolant may flow to one or more outlets located at the bottom of the stator 201 (e.g., the first outlet opening 216 and the second outlet opening 218 of FIG. 2, not depicted in FIG. 5). As the coolant flows through the coolant jacket, it may come into direct contact with surfaces of the protrusions forming the pin-fins (e.g., first side surface 308, second side surface 310, etc., shown by FIG. 3 and described above). When heat is transferred from the inner teeth through the annular plates to the pin-fins, the coolant may extract the heat from the stator 201 as it flows across the pin-fins (as shown by FIG. 9).

By flowing the coolant in the first circumferential direction 502 and in the second circumferential direction 506, from the location of the inlet opening 208 to the location of the outlet openings (e.g., first outlet opening 216 and the second outlet opening 218, shown by FIG. 2), a length of a path of coolant flow from the inlet opening 208 to the outlet openings may be reduced (e.g., relative to examples in which coolant flows around a larger portion of the stator). As a result of the reduced length of the coolant flow path, a power and/or size of a coolant pump configured to provide the coolant to the inlet opening 208 may be reduced (e.g., pump 154 described above with reference to FIG. 1), which may reduce a cost and/or assembly time of the electric motor and/or vehicle. Because the coolant is driven by gravity in the direction from the inlet opening 201 toward the outlet openings (e.g., from the first end 511 toward the second end 513), the power and/or size of the coolant pump may be further reduced, which may further reduce costs and/or assembly time. Additionally, by reducing the length of the coolant flow path and driving the coolant via gravity, an amount of coolant (e.g., a flow volume of coolant) flowing from the inlet opening 201 to the outlet openings may be increased, which may increase an amount of heat transferred to the coolant by the stator 201 and increase a cooling of the stator 201.

Additionally, by configuring the pin-fins to extend straight outward radially relative to the central axis and normal to the outer circumferential surfaces 514 of the stator 201 around the entire outer perimeter of the stator 201 as described above, the pin-fins may reduce a likelihood of formation of thermal boundary layers of the coolant flow while increasing a flow rate of the coolant through the clearances between the pin-fins relative to examples which do not include pin-fins that extend straight outward radially relative to the central axis. In particular, because the pin-fins extend straight outward radially, surfaces of the pin-fins are arranged orthogonal to the flow direction of the coolant (e.g., the flow of the coolant in the first circumferential direction 502 and the second circumferential direction 506). In this configuration, an amount of the flow in direct contact with the surfaces of the pin-fins may be increased, which may increase the heat transfer from the pin-fins to the coolant, reduce a likelihood of coolant pooling or coolant collecting around the pin-fins and not flowing toward the outlet openings, and increase a uniformity of the heat transfer around the entire perimeter of the stator 201 (e.g., reduce a likelihood of formation of areas of higher or lower coolant temperature surrounding adjacent pin-fins) relative to examples in which the pin-fins do not extend straight outward radially around the entire perimeter of the stator.

A sealant may be applied to the outer perimeter surface of the stator 201 to prevent the coolant from flowing between the annular plates 207 into an interior of the stator 201 (e.g., into the central opening 203. The coolant may be directed across the top of the stator 201 in the first circumferential direction 502 and second circumferential direction 506 due to the force of gravity and/or due to a pressure exerted on the coolant by a pump (e.g., the pump 154 of vehicle 100 of FIG. 1). As the coolant flows circumferentially around the stator 201, through the clearances, and across the surfaces of the pin-fins, a flow rate of the coolant may increase as a function of a slope of the outer surface of the stator 201 (e.g., a tangent to the outer surface of the stator 201). Gravity may force the coolant through the clearances between the pin-fins and increase the flow rate of the coolant through the clearances. The increased surface area provided by the pin-fins increases a surface area of the stator 201 in contact with the coolant, which may increase an efficiency of heat transfer from the stator 201 to the coolant.

In some examples, the coolant may be further cooled by elements of a cooling system external to the stator 201. The coolant may be propelled via the pump (e.g., such as the pump 154 of vehicle 100 of FIG. 1) to circulate the coolant through the cooling system, which may include one or more additional apparatuses designed to extract heat from the coolant. For example, the coolant may flow through a heat exchanger arranged externally to the electric motor, where the coolant may be contact with surfaces of the heat exchanger that conduct heat from the coolant to a material of the heat exchanger. However, in other examples, the coolant may absorb heat from the pin-fins and may transfer the heat to atmospheric air.

FIG. 6 shows an enlarged view of inset 504 of FIG. 5. Pin-fins on outer surfaces of the stator 201 comprise the outer protrusions of the plurality of annular plates of the stator 201, as described above in reference to FIGS. 4 and 5. Annular plate 206, annular plate 400, annular plate 402, annular plate 404, annular plate 406, and annular plate 408 of FIG. 4 comprise the first six plates of the stator 201.

The pin-fins are shown aligned in rows in the axial direction (e.g., the direction of central axis 204). For example, row 606 comprises nine pin-fins aligned along the axis 412 (described above in relation to FIGS. 4 and 5), while row 604 comprises nine pin-fins along the axis 508, parallel with the central axis 204 (shown by FIG. 5) and the axis 412. The pin-fins aligned along axis 412 are shown in a staggered position in relation to the pin-fins aligned along axis 508, whereby the pin-fins of row 606 are circumferentially adjacent (e.g., adjacent, in the circumferential direction) to the recessed surfaces arranged axially (e.g., in the direction of the central axis 204) between the pin-fins of row 604. Each pin-fin is formed by a pair of protrusions extending from a pair of adjacent annular plates. For example, a first pin-fin of row 606 comprises outer protrusion 436 of annular plate 206 and outer protrusion 438 of annular plate 400 (e.g., the first pair 440 of annular plates of FIG. 4). A first pin-fin of row 604 comprises outer protrusion 422 of annular plate 402 and outer protrusion 424 of annular plate 404 (e.g., the second pair 434 of annular plates of FIG. 4), which is radially aligned with a recessed surface between the first pin-fin of row 606 and a second pin-fin of row 606.

The pin-fins shown in FIG. 6 are also arranged in circumferential rows around the outer perimeter of the stator 201. For example, arrow 600 indicates a circumferential row comprising a plurality of pin-fins, where each pin-fin of the plurality of pin-fins comprises one outer protrusion from annular plate 406 and one outer protrusion from annular plate 408 (e.g., the third pair 420 of annular plates of FIG. 4). Arrow 602 indicates a circumferential row comprising a plurality of pin-fins, where each pin-fin of the plurality of pin-fins comprises one outer protrusion from annular plate 404 and one outer protrusion from annular plate 402 (e.g., the second pair 434 of annular plates of FIG. 4). Thus, each pin-fin is formed by a pair of outer protrusions of adjacent annular plates, where the pair of outer protrusions have the same outer protrusion arrangement (e.g., the outer protrusions forming the pair are axially aligned). The pin-fins of the circumferential row indicated by the arrow 600 may be configured in a staggered arrangement with respect to the pin-fins of the circumferential row indicated by the arrow 602.

The arrangement of pin-fins forms clearances between the pin-fins, through which the coolant may flow across the surfaces of the pin-fins. For example, axis 510 shows an axial channel across the outer surface of the stator, and the coolant may flow through the axial channel in the circumferential direction (e.g., urged by gravity in the first circumferential direction 502, shown by FIG. 5, across the axial channel). Each axial row of pin-fins may be separated from adjacent rows of pin-fins by a respective axial channel, such as the axial channel indicated by axis 510.

The circumferential rows also create clearances that form circumferential channels through which the coolant may flow circumferentially (e.g., in the first circumferential direction 502 or second circumferential direction 506 shown by FIG. 5). For example, the staggered configuration of pin-fins of the circumferential rows indicated by arrow 600 and arrow 602 provide circumferential channels through which the coolant may flow across the staggered recessed surfaces between the outer protrusions. As one example, coolant may flow along surfaces of the pin-fins arranged in the circumferential rows indicated by arrow 600 and arrow 602. The coolant may be urged by gravity to flow in the circumferential direction (e.g., first circumferential direction 502, shown by FIG. 5), and as the coolant comes into contact with the pin-fins arranged in the circumferential rows indicated by arrow 600 and arrow 602, the coolant may flow at least partially in the axial direction around the pin-fins and through the clearances formed between the pin-fins. For example, the coolant may flow in the circumferential direction and may come into contact with one of the pin-fins, with the pin-fin diverting the flow of the coolant partially in the axial direction around the pin-fin while maintaining the flow of the coolant in the circumferential direction due to the urging of the coolant in the circumferential direction via gravity. In this configuration, the flow direction of the coolant may have only a circumferential direction component or both of a circumferential direction component and an axial direction component (e.g., as the coolant is diverted to one side or the other into the staggered clearances around the pin-fins). As a result, a greater amount of surface area of the pin-fins may be exposed to contact with the coolant, and an efficiency of heat transfer from the stator to the coolant may be increased. A flow of coolant through an arrangement of pin-fins is described in greater detail below in relation to FIG. 7.

Referring now to FIG. 7, a flat view of a portion of the outer perimeter of the stator 201 is shown. The flat view represents a curved section of the stator 201, such as the curved section of stator 201 shown in FIG. 6. In the flat view, the circumferential direction 708 (e.g., the direction around the central axis of the stator, as indicated by first circumferential direction 502 and second circumferential direction 506 shown by FIG. 5) is depicted vertically, while the axial direction 710 (e.g., the direction parallel to the central axis 204, shown by FIG. 5) is depicted horizontally. A coolant flowing circumferentially through the pin-fin arrangement of stator 201 (e.g., in the first circumferential direction 502 or the second circumferential direction 506 of FIG. 5) flows in the downward direction in FIG. 7 in accordance with arrow 716, arrow 718, and arrow 720. The pin-fins axially aligned along row 604 and row 606 of FIG. 6 are depicted horizontally in FIG. 7, and the circumferential rows indicated by arrow 600 and arrow 602 in FIG. 6 are depicted vertically in FIG. 7. Thus, the staggered arrangement of the pin-fins may be configured in an overlapping quincunx configuration.

As described above, a coolant flowing through the pin-fin arrangement will be directed into clearances between the pin-fins. Clearances in the circumferential direction 708 result from a difference between the length of the protrusions of the underlying plates (e.g., the length 309 of FIG. 3) and the length of the recessed surfaces between the protrusions along the outer perimeter of each underlying plate (e.g., the length 318 of FIG. 3). For example, a length 715 of each protrusion of a given annular plate in the circumferential direction may be 0.6 centimeters, and a length 717 between outer protrusions of the given annular plate may be 1.05 centimeters, with the length 717 between the outer protrusions forming at least some of the clearances. The outer protrusions may additionally be axially aligned with recessed surfaces adjacent annular plates, forming clearances in the circumferential direction 708 between the pin-fins of the given annular plate and the pin-fins of adjacent annular plates, with the clearances having a length 719 of 0.228 centimeters in the circumferential direction 708 in some examples. Thus, in an embodiment, row 604 of axially aligned pin-fins may have an axial channel 724 above it, aligned with axis 510 of FIG. 5, and an axial channel 726 below it, aligned with axis 722. The width of each of the axial channel 724 and the axial channel 726 in the circumferential direction 708 may be 0.228 centimeters. Although the dimensions above are provided as examples, such examples are non-limiting.

Clearances in the axial direction 710 (e.g., clearances in the direction of the central axis 204, shown by FIG. 5) result from the staggering of the pin-fin arrangements between pairs of annular plates, as described above in relation to FIG. 4. Thus, the width of the clearances in the axial direction may be determined by a thickness of the annular plates. For example, if each annular plate of the stator 201 (e.g., annual plate 206 of FIG. 2) is 0.3 centimeters thick, and each pin fin comprises protrusions of two annular plates, the width of clearances between axially aligned pin-fins in the axial direction 710 may be 0.6 centimeter (e.g., the width of each row defined by arrow 600 and arrow 602 in the axial direction 710). As coolant flows through the pin-fin arrangement, the flow of the coolant in the circumferential direction 708 may be diverted by pin-fins at regular intervals at least partially in the axial direction 710 (e.g., due to contact of the coolant against the surfaces of the pin-fins). In some examples, each annular plate may comprise two or more layers of material (e.g., two or more thin plates).

As an example, a flow of coolant at location 700 flowing in the direction indicated by arrow 720 is directed downward (e.g., vertically downward in the circumferential direction 708, due to gravity) through a recessed surface between adjacent annular plates forming the pin-fins of row 606. The flow of the coolant may flow across the pin-fin 705 and be diverted around the pin-fin 705 in the axial direction 710 (e.g., along axial channel 724), as indicated by arrow 701 and arrow 702, where a portion of the coolant flow may follow the path indicated by arrow 701 and a portion of the coolant flow may follow the path indicated by arrow 702. The portion of the coolant flow that flows around pin-fin 705 as indicated by arrow 701 flows downward through a recessed surface between adjacent annular plates including outer protrusions forming the row 604. The flow of the coolant may flow across the pin-fin 707 and be diverted around the pin-fin 707 in the axial direction 710, as indicated by arrow 704 and arrow 706, where a portion of the coolant flow may follow the path indicated by arrow 704 and a portion of the coolant flow may follow the path indicated by arrow 706. In this way, coolant flowing through the pin-fin arrangement may follow various different paths through the clearances formed between the pin-fins and may come into direct contact with a larger amount of surface area of the pin-fins. For example, in the flat view shown by FIG. 7, a portion of the coolant flow may follow a diagonal path downward and to the right, where upon flowing across surfaces of a pin-fin, the portion may be divided into two subsequent portions, one subsequent portion following a diagonal path downward and to the left, and the other subsequent portion following a diagonal path downward and to the right, and so on, whereby at each junction of clearances a portion of the coolant flow may be directed diagonally in one direction and a portion of the flow may be directed diagonally in another direction. A portion of the coolant may also flow along diagonal paths in the same direction, such as the diagonal paths indicated by axis 712 and axis 714. At the sides of the stator 201, the flow of coolant may flow against an edge of the stator 201 or a side of a casing (e.g., the casing 202 of FIG. 2), whereby the coolant may be redirected axially away from the edge of the stator 201 and/or side of the casing by the pin-fins.

Thus, as portions of the coolant flow through the passages created by the clearances between the pin-fins from an inlet to an outlet, the portions divide and merge at regular intervals in accordance with the quincunx configuration of the pin-fin arrangement. The flow of coolant may be directed by virtue of the quincunx configuration, whereby the flow of coolant around any pin-fin of the pin-fin arrangement may be substantially the same as the flow of coolant around the other pin-fins in the same axial row of the pin-fin arrangement. For example, a flow rate of the coolant measured at the location 700 of FIG. 7 may be the same as a flow rate of the coolant measured between any other pin-fins of row 606. Similarly, an eddy formed under the pin-fin 705 by a flow of coolant indicated by the arrow 706 may have similar and/or symmetrical properties (e.g., size, angular speed, etc.) to an eddy formed under a pin-fin 709 by a flow of coolant indicated by the arrow 704. In this way, a consistent fluid dynamics of the coolant flow may be maintained across the surface of the outer perimeter of the stator 201, whereby the flow may have characteristics that may be pre-determined and/or predicted. Further, one or more properties of the pin-fin arrangement (e.g., pin-fin dimensions, configuration, etc.) may be adjusted to alter the fluid dynamics of the coolant flow, in order to adjust a thermodynamic property of the coolant. For example, by increasing or decreasing the size of the pin-fins, or the axial and/or radial distance between the pin-fins, or the shape of the pin-fins, a flow rate, degree of turbulence, and/or other property of the coolant related to thermal resistance may be adjusted such that the thermal resistance of the coolant may be reduced, and a transfer of heat from the stator 201 to the coolant may be increased.

Additionally, the staggered arrangement of the pin-fins as described above provides increased heat transfer from the stator to the coolant and increases the amount of coolant in direct contact with the pin-fins without additional partitions, barriers, or other components arranged in the path of the coolant flow. In particular, the coolant may flow from the inlet opening to the outlet openings in both the first circumferential direction 502 and the second circumferential direction 504 (shown by FIG. 5) without coming into contact with walls or other components that may cause the coolant to collect or pool. As a result, the uniformity of the heat transfer from the stator to the coolant may be increased, which may increase a durability and/or cooling of the stator.

Referring now to FIG. 8, a partial view of the electric motor 200 of FIG. 2 is shown, illustrating a relative arrangement of pin-fins 500 and casing 202. The casing 202 may be a cylindrical casing housing the stator 201, with an interior space 802 formed between the casing 202 and the stator 201. The casing 202 includes an outer circumferential surface 804 and an inner circumferential surface 806. Coolant (e.g., oil, as described above) may flow into the casing 202 via the inlet opening 208 positioned at a first end 801 (e.g., top end) of the casing 202. The coolant may flow along the inner circumferential surface 806 of the casing 202 and the outer circumferential surfaces of the annular plates (e.g., the pin-fins and recessed surfaces of the outer perimeter of the stator 201) and may flow out of the casing at the first outlet opening 216 described in FIG. 2, with the first outlet opening 216 arranged at an opposing, second end 803 (e.g., bottom end) of the casing 202. The casing 202 may also have a third outlet opening 800 positioned at the second end 803 of the casing 202, for example, to allow the coolant to flow out of the casing 202 more evenly and/or more quickly. In some examples, the casing 202 may include additional outlet openings, such as a fourth outlet opening arranged at the second end 803. The pin-fins of the outer perimeter of the stator 201 create a plurality of clearances through which the coolant is directed (e.g., by gravity, or by the action of a pump), whereby the coolant flows around the pin-fins on its way towards the first outlet opening 216, second outlet opening 218 (shown by FIG. 2), and the third outlet opening 800. In this way, heat may be transferred to the coolant from the stator 201 via a fluid contact between the coolant and a plurality of surfaces of the pin-fins.

As the coolant flows from the inlet opening 208 of the casing 202 to the first outlet opening 216, second outlet opening 218 (shown by FIG. 2), third outlet opening 800, etc. of the casing 202, at the top (e.g., first end 801) of the stator 201 a force of gravity may cause the coolant to exert pressure against the surface of the outer perimeter of the stator 201. In some examples, the pin-fins 500 of the pin-fin arrangement on the surface of the outer perimeter of the stator 201 may fully extend to the inner circumferential surface 806 of the casing 202, leaving no space in a radial direction (e.g., radially, relative to central axis 204 shown by FIGS. 2 and 5) between the pin-fins 500 of the pin-fin arrangement and the inner circumferential surface 806. In other examples, the pin-fins 500 of the pin-fin arrangement may not extend fully to the inner circumferential surface 806 of the casing 202, leaving a space through which the coolant may pass as it flows across the inner circumferential surface 806 of the casing 202. The pin-fins 500 may terminate without bends or curvature (e.g., the pin-fins 500 may extend in the radial direction and may terminate, or end, without bending or curving away from the radial direction). Providing a space between the pin-fins 500 of the pin-fin arrangement and the inner circumferential surface 806 of the casing 202 may increase an efficiency of heat transfer between the stator 201 and the coolant by increasing a thermally conductive surface area between the outer surface of the stator 201 and the coolant.

In FIG. 9, a temperature map 900 of the stator 201 is shown. A density of stipple shading indicates a temperature of the stator 201 during operation of the electric motor with coolant flowing to the electric motor, where larger stippling indicates a higher temperature and a smaller stippling indicates a lower temperature. For example, a stippling scale 902 illustrates a temperature gradient, where larger stipple shading at the top portion of the stippling scale indicates a higher temperature (e.g., 126 degrees Celsius), and the smaller stipple shading at the bottom portion of the stippling scale 902 indicates a lower temperature (e.g., 107 degrees Celsius).

In the temperature map 900 of the stator 201, the larger stipple shading at the bottom portion of the stator 201 (e.g., proximate to the location of the first outlet opening 216 and third outlet opening 800) indicates higher temperature, and the smaller stipple shading at the top portion of the stator 201 (e.g., proximate to the location of the inlet opening 208) indicates lower temperature. The temperature may be a function of distance from the inlet opening 208, in some examples.

As coolant flows across the pin-fins, the flow is directed by the pin-fins in a non-linear fashion, whereby a thermal resistance of the coolant is lowered due to the non-linear flow. For example, in examples of electric motors that do not include the pin-fin arrangement described herein, a thermal resistance of coolant over a first length of the flow (e.g., an entrance length, through which a velocity of the flow is increasing at a first rate) may be different relative to a thermal resistance of the coolant over a second length of the flow (e.g., a length through which a velocity of the flow is increasing at a second rate). However, by configuring the electric motor with the pin-fins as described herein, a uniformity and/or consistency of the thermal resistance of the coolant at various locations along the stator 201 and casing 202 may be increased. As a result, the electric motor may be cooled more uniformly and/or consistently via the flow of coolant across the surfaces of the pin-fins, as described above.

In examples in which a stator includes no protrusions on the outer surface (e.g., the stator does not include the pin-fins described herein), a surface area of the stator in contact with the coolant may be low, which may reduce an ability of the coolant to extract heat from the stator. Alternatively, in examples in which the stator includes a large amount of tortuous passages, axially-aligned fins, etc., the flow of coolant through the electric motor may be relatively slow, resulting in a relatively large backpressure of the coolant against the pump. The large backpressure may increase a heat generation of the pump and/or decrease an energy efficiency of the pump, which may increase a likelihood of pump degradation.

By providing the stator 201 with the pin-fins as described herein, heat transfer between the stator 201 and the coolant may be balanced and more efficient by providing the stator 201 with increased surface area while also maintaining a relatively high flow rate of the coolant through the electric motor via the clearances between the pin-fins. In particular, the quincunx arrangement of the pin-fins increases the surface area of the stator 201 in contact with the flow of the coolant while providing multiple flow directions for the coolant to increase the flow rate of the coolant through the electric motor, which may increase heat extraction from the electric motor.

Figure 10:
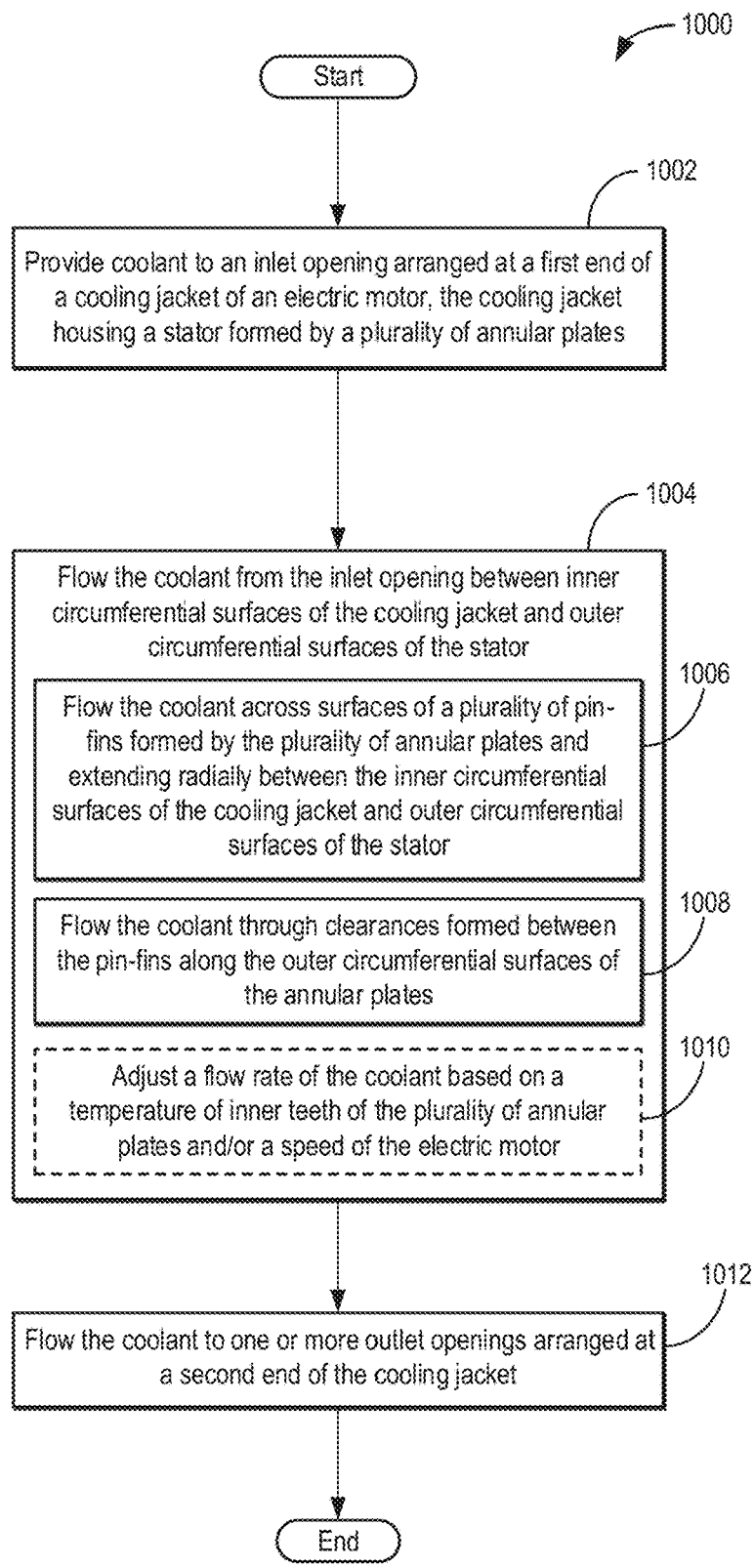
FIG. 10 shows a flowchart illustrating a method for flowing coolant through an electric motor including a stator having pin-fins formed at an outer perimeter of the stator.

Referring now to FIG. 10, an example method 1000 is shown describing the flow path of coolant across an arrangement of pin-fins formed on a surface of a stator of an electric motor, such as the pin-fins 500 of the stator 201 shown in FIGS. 5 and 6. Example method 1000 may be executed by a controller, such as the controller 110 of vehicle 100 of FIG. 1.

Method 1000 starts at 1002, where method 1000 includes providing coolant to an inlet opening arranged at a first end of a casing of an electric motor, the casing housing a stator formed by a plurality of annular plates. For example, the electric motor may be the same as or similar to the electric motor 153 of the electric axle drive unit 152, or the electric motor 105 of vehicle 100 of FIG. 1. The stator may be the same as or similar to the stator 201 and the casing may be the same as or similar to the casing 202 shown in FIG. 2. The annular plates may be the same as or similar to the annular plate 206 shown in FIG. 3, and/or annular plate 400, annular plate 402, annular plate 404, annular plate 406, and annular plate 408 of FIG. 4. In an embodiment, the first end of the casing is the top of the casing, whereby the coolant may enter the inlet opening by a force of gravity. In other embodiments, the first end of the casing may not be the top of the casing, and the coolant may enter the inlet opening due to pressure generated by a pump (e.g., the pump 154 of vehicle 100 of FIG. 1). In still other embodiments, the coolant may enter the inlet opening both by the force of gravity and due to pressure generated by a pump.

At 1004, method 100 includes flowing the coolant from the inlet opening into a cavity (e.g., a coolant jacket) between inner circumferential surfaces of the casing and outer circumferential surfaces of the stator. For example, the coolant may be a coolant pumped to inlet opening by a pump, such as the pump 154 of vehicle 100 of FIG. 1. The cavity may be sealed, whereby the coolant may not penetrate the stator and may flow circumferentially around a perimeter surface of the stator. At 1006, method 1000 includes flowing the coolant across surfaces of a plurality of pin-fins formed by the plurality of annular plates and extending radially between the inner circumferential surfaces of the casing and outer circumferential surfaces of the stator. In an embodiment, the pin-fins may be formed by protrusions on the outer perimeter of each annular plate, such as first protrusion 306 of annular plate 206 shown in FIG. 3. At 1008, method 1000 includes flowing the coolant through clearances formed between the pin-fins along the outer circumferential surfaces of the annular plates. For example, the clearances may be formed by a staggered pin-fin arrangement in a quincunx pattern, as shown by FIG. 7, whereby coolant flowing circumferentially around the stator may be obstructed at regular intervals by a pin-fin, thereby causing the coolant to be diverted axially along one or more diagonal paths. As described above in reference to FIGS. 8 and 9, the quincunx pattern may extend a surface area over which a thermal resistance of the coolant may be low, whereby a heat transfer from the stator to the coolant may be increased.

At 1010, method 1000 includes adjusting a flow rate of the coolant based on a temperature of inner teeth of the plurality of annular plates and/or a speed of the electric motor. For example, as the speed of the electric motor increases, a heat generated by the motor may increase. To extract the heat from the motor, the stator may be constructed from thermally conductive materials (e.g., iron) that draw the heat to a perimeter surface, where the heat is transferred to the coolant. The amount of heat transferred from the stator to the coolant may depend on a flow rate of the coolant, whereby adjusting the flow rate may result in a greater or lesser amount of heat transfer. As an example, under some circumstances, the heat transfer may be increased by increasing the flow rate.

In an embodiment, the flow rate of the coolant may be adjusted by adjusting a speed of a pump, such as the pump 154 of vehicle 100 of FIG. 1. For example, increasing the speed of the pump may increase the flow rate of the coolant around the electric motor. The speed of the pump may be controlled by a controller such as the controller 110 of vehicle 100 of FIG. 1, which may control the speed of the pump based on an output of one or more sensors. For example, the controller may receive an output of a temperature sensor of the electric motor, and/or an output of an oil pressure sensor of the electric motor, and/or an output from a throttle position sensor, etc. It should be appreciated that the examples listed herein are for illustrative purposes, and other numbers or types of sensors may be used by the controller to control the flow of coolant without departing from the scope of this disclosure.

At 1012, method 1000 includes flowing the coolant to one or more outlet openings arranged at a second end of the casing. The outlet openings may be the same as or similar to the first outlet opening 216 and second outlet opening 218 of FIG. 2 and/or the third outlet opening 800 of FIG. 8. In an embodiment, the second end of the casing is the bottom of the casing, whereby the coolant may exit the one or more outlet openings by a force of gravity. In other embodiments, the second end of the casing may not be the bottom of the casing, and the coolant may exit the one or more outlet openings as result of a pressure generated by a pump (e.g., the pump 154 of vehicle 100 of FIG. 1). In still other embodiments, the coolant may exit the one or more outlet openings both by the force of gravity and as a result of pressure generated by the pump.

Thus, an efficiency of a heat transfer between the stator and the coolant may be increased. By providing the stator with the pin-fins as described herein and flowing the coolant across the surfaces of the pin-fins, heat transfer between the stator and the coolant may be increased, which may increase a cooling of the electric motor.

The technical effect of a quincunx pin-fin arrangement on a surface of a stator of an electric motor as described herein is to increase a transfer of heat from the stator to the coolant flowing across the surfaces of the pin-fins.

FIGS. 2-9 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example.

In one embodiment, an electric motor comprises: a casing including a coolant inlet arranged opposite to a coolant outlet across a central axis of the electric motor; a stator housed within the casing and forming a plurality of pin-fins extending straight outward radially, relative to the central axis, from outer circumferential surfaces of the stator in a staggered arrangement around an entire perimeter of the stator; and a plurality of clearances formed between adjacent pin-fins of the plurality of pin-fins, the plurality of clearances adapted to flow a coolant from the coolant inlet to the coolant outlet. In a first example of the electric motor, the stator comprises a plurality of annular plates, with each annular plate of the plurality of annular plates arranged in face-sharing contact with each adjacent annular plate of the plurality of annular plates along a central axis of the electric motor. A second example of the electric motor optionally includes the first example, and further includes wherein the plurality of annular plates includes a first group of annular plates and a second group of annular plates, where each annular plate of the first group of annular plates forms a first group of the plurality of pin-fins in a first circumferential arrangement, and where each annular plate of the second group of annular plates forms a second group of the plurality of pin-fins in a second circumferential arrangement that is offset relative to the first circumferential arrangement. A third example of the electric motor optionally includes one or both of the first and second examples, and further includes wherein each annular plate of the second group of annular plates is in an alternating arrangement with each annular plate of the first group of annular plates in an axial direction of the stator. A fourth example of the electric motor optionally includes one or more or each of the first through third examples, and further includes wherein each annular plate of the first group of annular plates is axially adjacent to at least one annular plate of the second group of annular plates. A fifth example of the electric motor optionally includes one or more or each of the first through fourth examples, and further includes wherein no portion of any pin-fin of the first group of the plurality of pin-fins in the first circumferential arrangement is axially aligned with any portion of any pin-fin of the second group of the plurality of pin-fins in the second circumferential arrangement. A sixth example of the electric motor optionally includes one or more or each of the first through fifth examples, and further includes wherein each annular plate of the plurality of annular plates includes a plurality of inner teeth arranged along a perimeter of a central opening and extending in a radial direction toward a midpoint of the central opening. A seventh example of the electric motor optionally includes one or more or each of the first through sixth examples, and further includes wherein each annular plate of the plurality of annular plates includes an equal number of inner teeth of the plurality of inner teeth, with the plurality of inner teeth of each annular plate of the plurality of annular plates being axially aligned with the plurality of inner teeth of each other annular plate of the plurality of annular plates. An eighth example of the electric motor optionally includes one or more or each of the first through seventh examples, and further includes wherein each annular plate of the plurality of annular plates includes a plurality of protrusions spaced equally along an outer circumference of each annular plate and extending in a radial direction, and where each pin-fin of the plurality of pin-fins is formed by a corresponding pair of protrusions of the plurality of protrusions of two annular plates of the plurality of annular plates. A ninth example of the electric motor optionally includes one or more or each of the first through eighth examples, and further includes wherein each pin-fin of the plurality of pin-fins is a rectangular cuboid.

In one embodiment, a method comprises: providing coolant to an inlet opening of a casing of an electric motor including a stator; and flowing the coolant from the inlet opening between inner circumferential surfaces of the casing and outer circumferential surfaces of the stator through a plurality of clearances formed by a plurality of pin-fins of the stator. In a first example of the method, flowing the coolant through the plurality of clearances includes flowing the coolant across surfaces of the plurality of pin-fins, the pin-fins extending radially between the inner circumferential surfaces of the casing and outer circumferential surfaces of the stator. A second example of the method optionally includes the first example, and further includes wherein flowing the coolant through the plurality of clearances includes flowing the coolant along the outer circumferential surfaces of the stator. A third example of the method optionally includes one or both of the first and second examples, and further includes flowing the coolant through the plurality of clearances to at least one outlet opening of the casing. A fourth example of the method optionally includes one or more or each of the first through third examples, and further includes wherein flowing the coolant through the plurality of clearances to the at least one outlet opening of the casing includes driving the coolant through the plurality of clearances via gravity in a first circumferential direction and an opposite, second circumferential direction from the inlet opening. A fifth example of the method optionally includes one or more or each of the first through fourth examples, and further includes adjusting a flow rate of the coolant through the plurality of clearances based on a temperature of a plurality of inner teeth of the stator. A sixth example of the method optionally includes one or more or each of the first through fifth examples, and further includes wherein the stator comprises a plurality of annular plates aligned in an axial direction of the electric motor, with the plurality of pin-fins and the outer circumferential surfaces of the stator formed by the plurality of annular plates, and flowing the coolant from the inlet opening through the plurality of clearances to the outlet opening includes not flowing the coolant through the plurality of annular plates to the inner teeth.

In one embodiment, a vehicle system comprises: a drivetrain electric motor including: a casing having a coolant inlet arranged opposite to a coolant outlet across a central opening of the casing; a stator housed within the central opening of the casing; a plurality of pin-fins formed by the stator and extending straight outward, normal to outer circumferential surfaces of the stator, around an entire perimeter of the stator; and a plurality of clearances formed between the plurality of pin-fins; and a coolant circuit including a coolant pump and a plurality of coolant lines coupled to the coolant inlet and coolant outlet. In a first example of the vehicle system, the plurality of pin-fins includes first group of pin-fins arranged in a first set of circumferential rows and a second group of pin-fins arranged in a second set of circumferential rows encircling a central axis of the stator, where each pin-fin of the first group of pin-fins is misaligned with each pin-fin of the second group of pin-fins in a direction of the central axis. A second example of the vehicle system optionally includes the first example, and further includes wherein the stator comprises a plurality of annular plates forming a plurality of axially aligned inner teeth and the plurality of pin-fins, and further comprising: an electronic controller including instructions stored in non-transitory memory that when executed, cause the controller to: energize the coolant pump to flow coolant through the coolant circuit to the coolant inlet of the casing and through the plurality of clearances against surfaces of the pin-fins; and adjust a flow rate of the coolant to the coolant inlet of the casing and through the plurality of clearances against surfaces of the pin-fins based on a temperature of the plurality of inner teeth.

It will be appreciated that the configurations and routines disclosed herein are exemplary in nature, and that these specific embodiments are not to be considered in a limiting sense, because numerous variations are possible. As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

FIGS. 2-9 are shown to scale, although other relative dimensions may be used, if desired.

The invention claimed is:

1. A cooling system for an electric motor, comprising:
a stator comprising a first annular plate and a second annular plate, the first annular plate including a plurality of pin-fins formed integrally on an outer circumferential surface in a first arrangement and the second annular plate including a plurality of pin-fins formed integrally on an outer circumferential surface in a second arrangement, wherein the first annular plate and the second annular plate are arranged to alternate axially between the first arrangement of the plurality of pin-fins and the second arrangement of the plurality of pin-fins; and
a controller with computer-readable instructions stored in non-transitory memory that when executed cause the controller to:
energize a coolant pump; and
flow coolant through an inlet opening of a casing of the electric motor to an area between the casing the and the stator, wherein the plurality of pin-fins are spaced away from an inner circumferential surface of the casing, wherein the inlet opening extends radially through a first exterior surface of the casing, and wherein an outlet opening extends axially through a second exterior surface of the casing, the second exterior surface substantially perpendicular to the first exterior surface.

2. The cooling system of claim 1, wherein the annular plate is one of a plurality of annular plates, and wherein each of the plurality of annular plates comprises a plurality of inner teeth.

3. The cooling system of claim 2, wherein the plurality of inner teeth extends in a direction opposite to a direction in which the plurality of pin-fins extends, and wherein the plurality of pin-fins extends toward an inner circumference of the casing.

4. The cooling system of claim 2, wherein the area is sealed from the plurality of inner teeth.

5. The cooling system of claim 2, wherein gaps between the plurality of pin-fins are greater in size than gaps between the plurality of inner teeth.

6. The cooling system of claim 2, wherein the instructions further enable the controller to adjust a flow rate of coolant through the area in response to a temperature of the plurality of inner teeth.

7. The cooling system of claim 1, wherein coolant flows through gaps between adjacent pin-fins of the plurality of pin-fins.

8. A system, comprising:
an electric motor comprising a casing and a stator housed within the casing, wherein the stator comprises a plurality of annular plates, each of the plurality of annular plates comprising a plurality of pin-fins on an outer circumference and a plurality of teeth on an inner circumference, wherein the plurality of pin-fins shapes passages through which coolant flows, wherein a flow of coolant around each pin-fin through axial clearances and circumferential clearances in a same axial row of the plurality of pin-fins is substantially the same, wherein a coolant inlet extends radially through a first exterior surface of the casing, wherein a coolant outlet extends axially through a second exterior surface of the casing, and wherein the first exterior surface of the casing is substantially perpendicular to the second exterior surface of the casing.

9. The system of claim 8, wherein the plurality of pin-fins extends radially outward into a cavity between the casing and the stator.

10. The system of claim 8, wherein the plurality of pin-fins is in direct contact with coolant, and wherein the plurality of teeth is sealed from coolant.

11. The system of claim 8, wherein the plurality of pin-fins is straight and extends along a single axis.

12. The system of claim 8, wherein the plurality of pin-fins of adjacent plates of the plurality of annular plates is misaligned with one another in a circumferential direction.

13. The system of claim 8, wherein the plurality of pin-fins are in an overlapping quincunx configuration.

* * * * *